(12) United States Patent
Butcher

(10) Patent No.: US 8,363,247 B2
(45) Date of Patent: Jan. 29, 2013

(54) PRINTER CONTROL METHOD

(75) Inventor: James Christopher Butcher, Nottingham (GB)

(73) Assignee: Videojet Technologies Inc.

( * ) Notice: Subject to any disclaimer, the term of this patent is extended or adjusted under 35 U.S.C. 154(b) by 1311 days.

(21) Appl. No.: 11/994,107

(22) PCT Filed: Jun. 28, 2006

(86) PCT No.: PCT/GB2006/002374
§ 371 (c)(1),
(2), (4) Date: Dec. 27, 2007

(87) PCT Pub. No.: WO2007/003893
PCT Pub. Date: Jan. 11, 2007

(65) Prior Publication Data
US 2010/0172680 A1    Jul. 8, 2010

(30) Foreign Application Priority Data

Jun. 30, 2005    (GB) .................................. 0513363.2

(51) Int. Cl.
*G06F 15/00*    (2006.01)
*G06F 3/12*    (2006.01)
*G06K 1/00*    (2006.01)

(52) U.S. Cl. ...................................... 358/1.15; 358/1.13
(58) Field of Classification Search ................. 358/1.15, 358/1.13, 1.14, 1.1
See application file for complete search history.

(56) References Cited

U.S. PATENT DOCUMENTS

| | | | |
|---|---|---|---|
| 6,095,414 A | 8/2000 | Long et al. | |
| 7,278,579 B2 * | 10/2007 | Loffredo et al. | 235/462.46 |
| 2002/0122201 A1 | 9/2002 | Haraguchi et al. | |
| 2003/0114176 A1 * | 6/2003 | Phillipps | 455/500 |
| 2003/0155422 A1 | 8/2003 | Kawakami et al. | |
| 2005/0035198 A1 * | 2/2005 | Wilensky | 235/383 |

* cited by examiner

*Primary Examiner* — Douglas Tran
(74) *Attorney, Agent, or Firm* — Joseph A. Yosick

(57) ABSTRACT

A method for controlling a printer to carry out a printing operation. The method comprises, at a controller device, receiving first input data comprising data for identifying said printer and establishing a connection between said controller device and said printer in response to said first input data. Data for use in said printing operation is assembled and said assembled data is provided to said printer via said established connection.

61 Claims, 26 Drawing Sheets

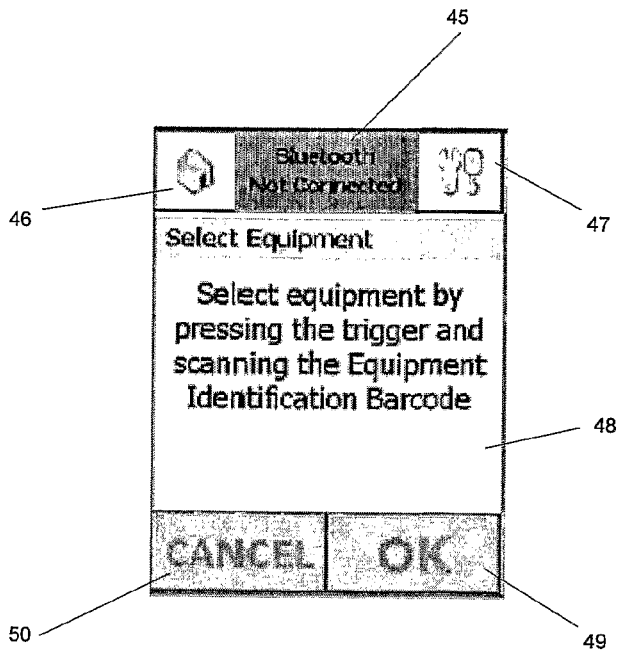
FIG 7
| Devices |
|---|
| Reference ID |
| Inteface Device Address |
| Device ID |
| Device Name |
| Display Name |
FIG 8
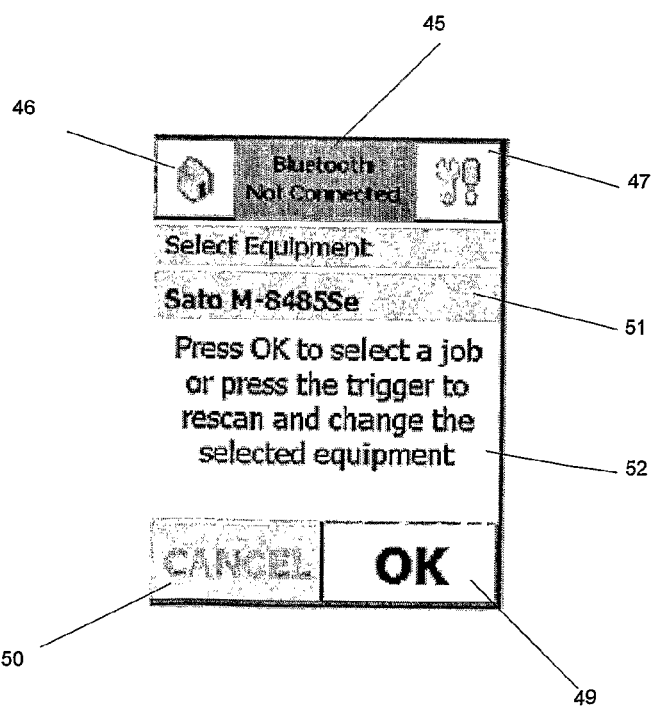
FIG 9

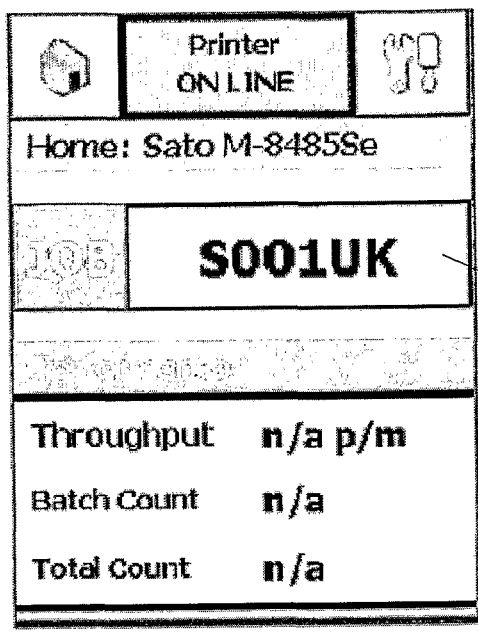
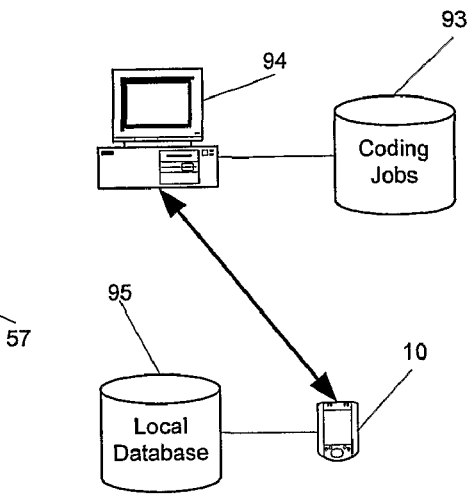
FIG 29
FIG 30
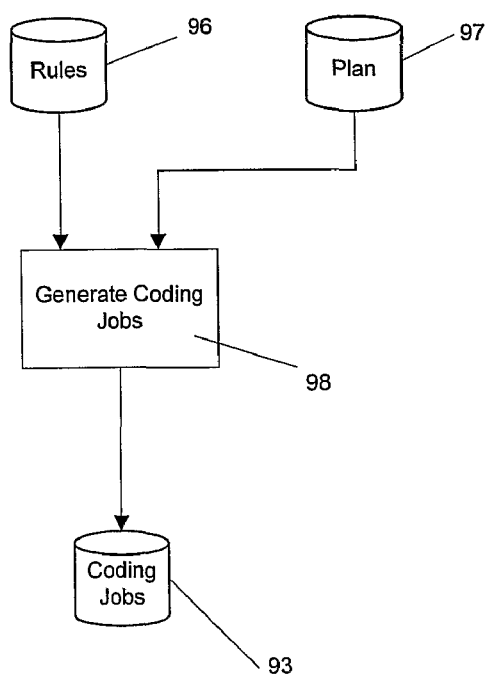
FIG 31

PRINTER CONTROL METHOD

This is a US National Stage application of International Application PCT/GB2006/002374 filed Jun. 28, 2006, claiming priority of British Patent Application No. 0513363.2 filed Jun. 30, 2005.

The present invention relates to a method of controlling a printer to carry out a printing operation, and more particularly, but not exclusively, to a method for controlling a printer to carry out a printing operation using a handheld device such as a personal digital assistant (PDA).

Consumer products such as food items are typically packaged in packaging onto which information is printed during the packaging process. Such information can include sell by, best before and use by dates, as well as information indicating a country of origin of the product or its price. The information also often includes a barcode which can be scanned at a point of sale to allow a product to be efficiently identified, and to allow its price to be efficiently determined by means of an appropriate database lookup operation. It will be appreciated that information of the type described above is likely to change relatively frequently, and accordingly can be printed on to the packaging only at the time at which packing takes place.

In addition to printing onto packaging of consumer products such as those described above, the consumer products are themselves often packaged into packs for distribution, and information is then printed onto these packs. The printed information may comprise a batch number, as well as a barcode and use by date.

Sophisticated printing equipment is typically used to print information of the type described above onto packaging material. Such printing equipment can print using any one of a variety of printing technologies including ink jet printing where small jets of ink are ejected onto the packaging, and thermal transfer printing where ink is transferred from an inked ribbon onto the packaging through the action of heat on the inked ribbon.

A variety of different types of printing equipment are routinely used in packaging facilities. Such different types of printing equipment typically have different command protocols which are used to control the printing equipment to carry out printing operations. In some facilities each printer has its own control console, and printers are set up to carry out printing operations independently of one another. Although such configurations allow printers to be effectively configured, it will be appreciated that such configurations are undesirable given that each printer must be set up independently. Additionally, any information which is to be included within a printed image must be provided to each printer independently.

US Patent Application Publication No. US2001/0005968 (Mills) describes a networked printing system in which printers to be controlled are connected to a databus. A controller computer is also connected to the databus, and in this way the controller computer can provide instructions to the printers via the databus. It is disclosed that the printers may have different command protocols, and it is therefore described that a connecting means connecting each printer to the databus is provided with means to translate commands on the databus directed to a particular printer into a command protocol appropriate for that printer.

Although the system described in US2001/0005968 allows a plurality of printers to be controlled from a single controller computer, it has a disadvantage that the controller computer is typically situated some way away from the individual printers, meaning that printing operations are initialised without an operator being able to check the current status of a packaging line.

In order to overcome the disadvantage set out above, Claricom Limited have provided a system in which an operator is provided with a barcode reader configured to read a barcode affixed to a printer. This barcode identifies the printer, and this identifier is transmitted from the barcode reader to the controller computer. The controller computer can then transmit commands to the identified printer to cause printing to take place.

Although the system described above removes the disadvantage associated with controlling a printer using a controller computer situated some distance away, it will be appreciated that this system still requires that printers on which printing operations are to take place are connected together and to the controller computer by means of a network. Such dependence upon a network is disadvantegous, given that time and money must be expended in setting up and configuring such a network.

It is an object of some embodiments of the present invention to obviate or mitigate at least some of the problems outlined above.

According to an aspect of the present invention, there is provided a method and device for controlling a printer to carry out a printing operation. The method comprises, at a controller device, reading an identifier associated with said printer, generating first input data in response to said read identifier comprising data for identifying said printer, establishing a connection between said controller device and said printer in response to said first input data, and using said established connection to control said printer.

Thus, the invention provides a method in which a device is configured to communicate with a printer. Controlling the printer may comprise causing data for use in the printing operation to be provided to the printer. The data may be provided to the printer from the controller device, or alternatively from a data store remote from the controller device. Causing data for use in the printing operation to be provided to the printer may comprise assembling data for use in the printing operation and providing the assembled data to the printer via the established connection.

Assembled data may be provided to the printer to cause the printer to carry out a printing operation. The assembled data preferably comprises data defining an image to be printed. Assembling data for use in said printing operation may comprise generating at least one command commanding said printer to carry out said printing operation, and the at least one command may specify image data to be printed.

The method may comprise disconnecting said connection after said assembled data has been provided to said printer via said connection The method may further comprise reading an identifier associated with said printer; and generating said first input data in response to said read identifier. The read identifier may comprise machine readable information such as a barcode, magnetically readable information, a radio frequency identifier or machine readable text.

The method may further comprise obtaining an address associated with said printer based upon said first input data; and using said address to establish said connection between said controller device and said printer.

Establishing said connection may comprise establishing a connection between said controller device and a communications interface, said communications interface being connected to said printer. Thus, the connection between the controller device and the printer may be a multi-part connection—a first part between the communications interface and the printer being permanently connected, with a second part between the controller device and the communications interface being connected when data is to be transmitted, so as to establish a connection between the controller device and the printer. The communications interface is preferably configured to receive data from the controller device in a first communications protocol (e.g. bluetooth data), to convert this data into a second communications protocol (e.g. serial data) and to provide this converted data to the printer. The first communications protocol may be a wireless communications protocol, while the second communications protocol may be a wired communications protocol.

Said assembling data may comprise assembling data from a data store stored on said controller device.

The method may further comprise receiving second input data comprising data identifying said printing operation. The method preferably comprises reading an identifier associated with said printing operation, and generating said second input data in response to said read data. The read identifier may comprise machine readable information of the type described above.

Receiving said second input data may comprise displaying a menu to a user, receiving data indicating user selection of an item from said menu, and generating said second input data based upon said menu selection.

Assembling data may comprise retrieving data from a data store in response to said second input data, said retrieved data indicating data required for use in said printing operation, and further indicating a form in which said data for use in said printer operation is to be assembled. The data store may be stored in a memory of said controller device.

The method may further comprise establishing a connection between said controller device and a host machine, and downloading data from said host machine to said controller device to form said data store. The host machine may provide access to a master data store comprising a plurality of records, and said downloading may download a subset of said plurality of records to said controller device.

The subset of said plurality of records may be selected by a user. Alternatively the said subset or records may be automatically selected based upon data stored within said subset of records. An appropriately configured computer program can carry out such automatic selection.

Each of the plurality of records may have associated time data, and said subset of said plurality of records maybe selected using said time data.

The method may further comprise processing said retrieved data to identify data required for use in said printing operation, and obtaining at least some of said identified data from a further data store. The further data store may be stored on said controller device.

The method may further comprise processing said retrieved data to identify data required for use in said printing operation, and prompting a user to enter data corresponding to at least some of said identified data. Prompting a user to enter data may comprise displaying a plurality of data values to the user, and receiving data indicating user selection of one of said values.

The assembled data may be generated from data in a printer independent format. Assembling data may comprise converting said data in said printer independent format into a format suitable for said printer.

According to a further aspect of the present invention, there is provided a method for controlling a printer to carry out a printing operation using a controller device, the method comprising: identifying a subset of records from a plurality of records stored within a data store associated with a host computer, based upon data stored within said subset of records; copying said subset of records from said data store associated with a host computer to a local data store associated with said controller device; reading data from said local data store for use in said printing operation; and providing said data to said printer.

Thus, the invention provides a convenient mechanism for downloaded data onto a controller device for use in printing operations. The data to be downloaded can be automatically selected on the basis of data stored within the records, thus manual input is minimised.

Each of the plurality of records may represent a unique print job. Each print job may represent a particular occasion on which a particular printer is to be commanded to print a particular image. Therefore, when the invention is applied in the field of product coding, each print job will relate to a particular occasion on which coding relating to a particular product is to be carried out.

Each of said plurality of records may comprise a field indicating a date associated with the respective printing operation. The subset of records may be identified based upon said field indicating a date, and said subset of records may be identified based upon said field indicating a date based upon a current date. The subset of records may be identified based upon all records having an associated date within a predetermined time period of said current date.

The invention further provides a method for configuring a controller device to control a printer to carry out a printing operation, the method comprising: identifying a subset of records from a plurality of records stored within a data store associated with a host computer, based upon data stored within said subset of records; copying said subset of records from said data store associated with a host computer to a local data store associated with said controller device, said controller device being configured to read data from said local data store for use in said printing operation and to provide said data to said printer.

There is also provided a method for controlling a printer to carry out a printing operation using a controller device, the method comprising: receiving a subset of records at said controller device from a host computer, said host computer being configured to identify a subset of records from a plurality of records stored within a data store associated with a host computer, based upon data stored within said subset of records; storing said received subset of records in a local data store associated with said controller device; reading data from said local data store for use in said printing operation; and providing said data to said printer.

All aspects of the invention set out above can be implemented by way of methods, devices, apparatus, or computer programs. Such computer programs can be embodied on suitable carrier media such as disks or communications signals.

Embodiments of the present invention will now be described, by way of example, with reference to the accompanying drawings, in which:

FIG. 7 is a screenshot of a screen displayed to a user during the processing shown in FIG. 6, prompting a user to scan a barcode identifying a printer;

FIG. 8 is a schematic illustration of a database used during the processing shown in FIG. 6;

FIG. 9 is a screenshot of a screen displayed to a user during the processing shown in FIG. 6, prompting a user to initiate a connection with a printer;

FIG. 29 is a screenshot displayed after image data has been transmitted from the PDA to the printer;

FIG. 30 is a schematic illustration of a PDA in communication with a host machine to allow data to be downloaded to the PDA;

FIG. 31 is a schematic illustration of a process used to generate a database containing details of print jobs;

Figure 1:
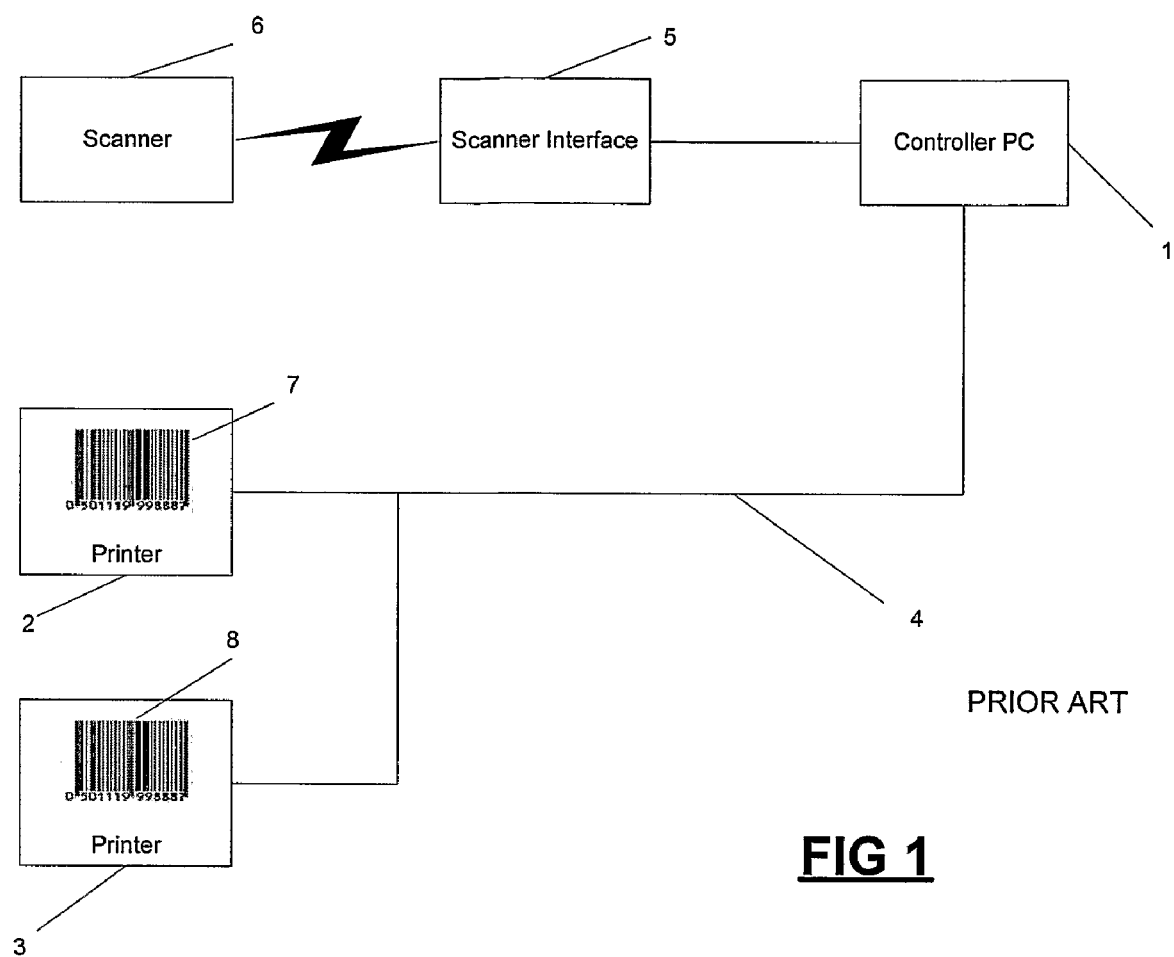
FIG. 1 is a schematic illustration of prior art apparatus used to control a printer to carry out a printing operation.

A prior art system for controlling a printer to carry out a printing operation is now described with reference to FIG. 1. A controller PC 1 is in communication with two printers 2, 3 via a network link 4. When a printing operation is to take place, the controller PC 1 provides data to one of the printers 2,3 via the network link 4, so as to cause the appropriate printer to carry out a printing operation.

It can be seen that the controller PC 1 is also connected to a scanner interface 5 which is in wireless communication with a barcode scanner 6. The controller PC 1 is connected to the scanner interface 5 via a wired serial link. The scanner interface 5 provides a cradle into which the barcode scanner 6 can be placed so as to cause a battery associated with the barcode scanner 6 to be charged.

Each of the printers 2, 3 has an associated barcode 7, 8. These barcodes are typically printed on respective labels, which are affixed to the respective printers. When a printing operation is to take place, an operator uses the barcode scanner 6 to read the barcode associated with the printer on which printing is to take place. Data representing the read barcode is then wirelessly passed from the barcode scanner 6 to the scanner interface 5. The data is subsequently passed from the scanner interface 5 to the controller PC 1 via the wired serial link. The controller PC 1 uses the received data to carry out a database lookup using the received barcode data, and this database lookup provides an address for the printer on which printing is to take place. Having determined this address, the controller PC 1 can cause printing to take place by providing appropriate commands to the appropriate printer via the network link 4.

An embodiment of the invention is now described in which one of a plurality of printers is controlled to carry out a printing operation. The printing operations are concerned with printing data onto packaging materials, or onto labels which are subsequently affixed to packaging materials. For example, the printing operations may cause images including items such as barcodes and best before dates to be printed onto packaging or labels. The images to be printed are typically such that some data is known well in advance of a printing operation (e.g. a barcode) while other of the data is known only at the time at which items are packaged, and printing takes place (e.g. a best before date).

Figure 2:
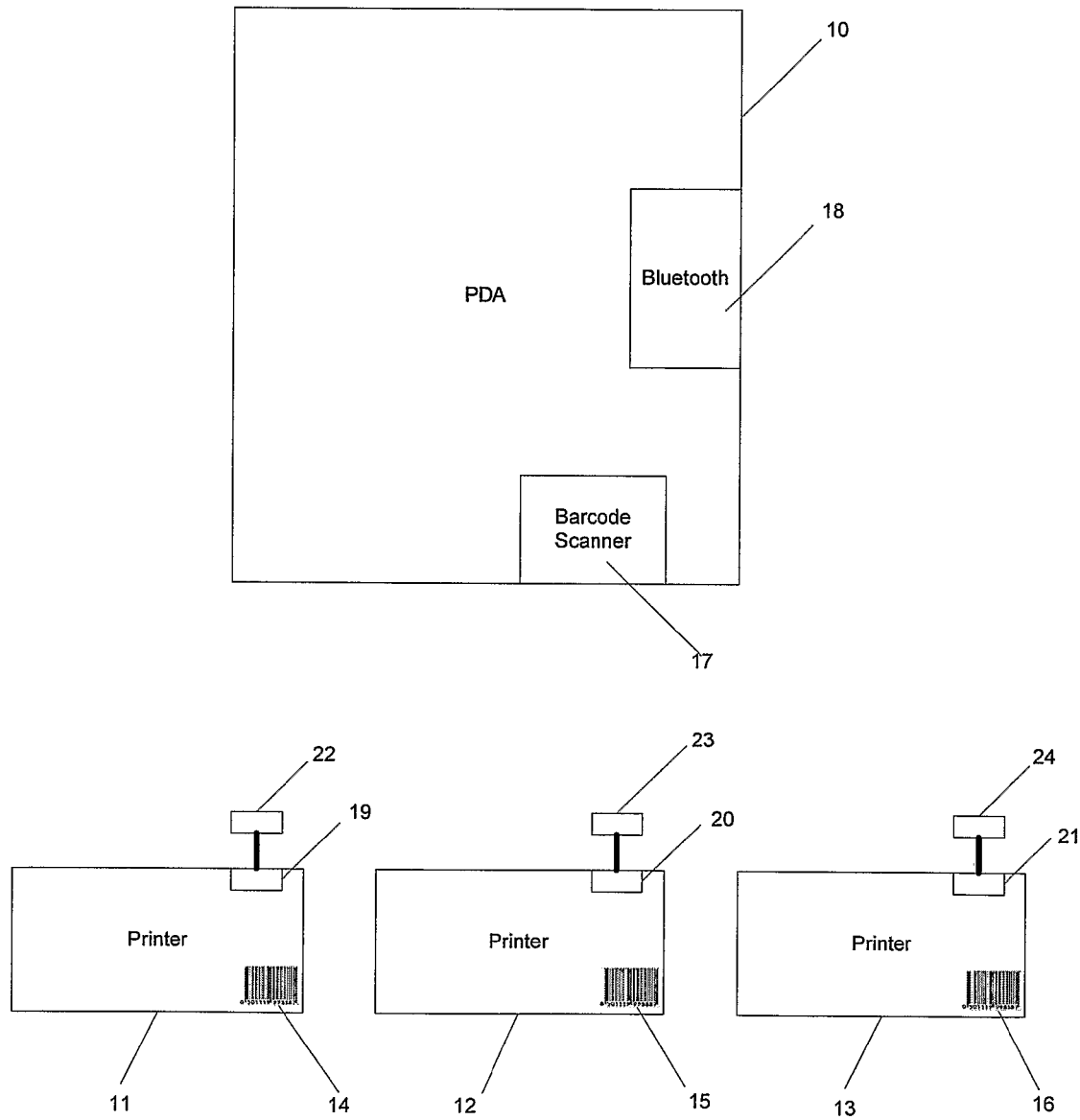
FIG. 2 is a schematic illustration of an apparatus used to control a printer to carry out a printing operation in an embodiment of the present invention.

Apparatus used to implement the described embodiment of the present invention is now described with reference to FIG. 2. A suitably configured personal digital assistant (PDA) 10 is configured to control three printers 11, 12, 13 to carry out respective printing operations. Although three printers 11, 12, 13 are shown in FIG. 2, it should be noted that in embodiments of the invention, any number of printers can be controlled by the PDA 10. The PDA 10 is configured so as to identify one of the printers 11, 12, 13 which is to be used to carry out a printing operation, and then to wirelessly provide data to the identified printer, to cause the printing operation to take place.

Each of the printers 11, 12, 13, has an associated barcode identifier 14, 15, 16. The barcode identifiers are preferably printed on labels which are affixed to the printers 11, 12, 13 when the printers are configured. The PDA 10 is provided with a barcode scanner 17 which is used to scan a barcode associated with one of the printers 11, 12, 13 on which a printing operation is to be carried out. This identification process is described in further detail below.

The PDA 10 is also provided with a bluetooth communications interface 18. The bluetooth communications interface 18 is used to provide commands and data to one of the printers 11, 12, 13 on which a printing operation is to take place. It should be noted that the printers 11, 12, 13 do not include an integral bluetooth communications interface. However, each of the printers 11, 12, 13 has a respective, RS232 serial interface 19, 20, 21, which is in use connected to a respective bluetooth interface 22, 23, 24. The PDA 10 is then able to control a respective one of the printers 11, 12, 13 by establishing a connection between its bluetooth interface 18 and the respective one of the bluetooth interfaces 22, 23, 24. Commands received by one of the bluetooth interfaces 22, 23, 24 are then converted into serial data, and passed to the respective RS232 serial interface 19, 20, 21 so as to control the respective printer to carry out a printing operation. Communication between the PDA 10 and the printers 11, 12, 13 is described in further detail below.

Bluetooth communication as used between the PDA 10 and the printers 11, 12, 13 will be well known to those of ordinary skill in the art. However, it should be noted that bluetooth communication typically uses a frequency band of 2.45 GHz. Each of the bluetooth interfaces has a unique 48-bit address, and a point-to-point connection is established between the bluetooth interface 18 of the PDA 10, and one of the bluetooth interfaces 22, 23, 24.

Figure 3:
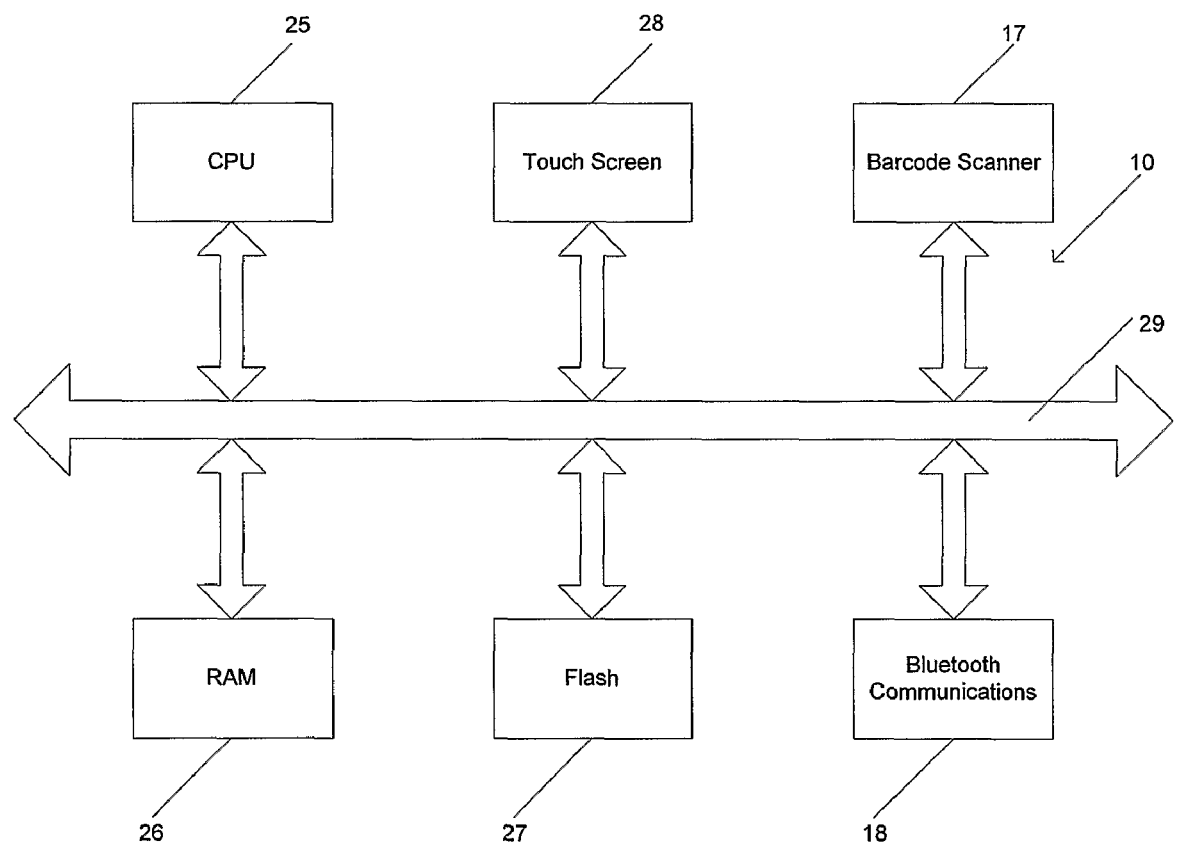
FIG. 3 is a schematic illustration showing a personal digital assistant (PDA) shown in FIG. 2 in further detail.

FIG. 3 shows components of the PDA 10 in further detail. It can be seen that the PDA comprises a processor 25 and random access memory (RAM) 26 which is used to store programs being executed by the processor 25. The RAM 26 also stores data to be used by programs executed by the processor 25. The PDA 10 further comprises non-volatile storage in the form of flash memory 27, which is used to store both programs executable on the PDA 10 and data for use by those programs. It can be seen that the PDA 10 further comprise a touch screen 28 which is used as an output device to display data to an operator, and also as an input device which detects pressure on the touch screen 28, and takes appropriate action based upon the position of that pressure on the touch screen 28. It can be seen that the barcode scanner 17 and the bluetooth communications interface 18 described above, are also shown in FIG. 3. The processor 25, the RAM 26, the flash memory 27, the touch screen 28, the barcode scanner 17 and the bluetooth communications interface 18 are connected together by a bus 29 along which data and instructions pass.

Figure 4:
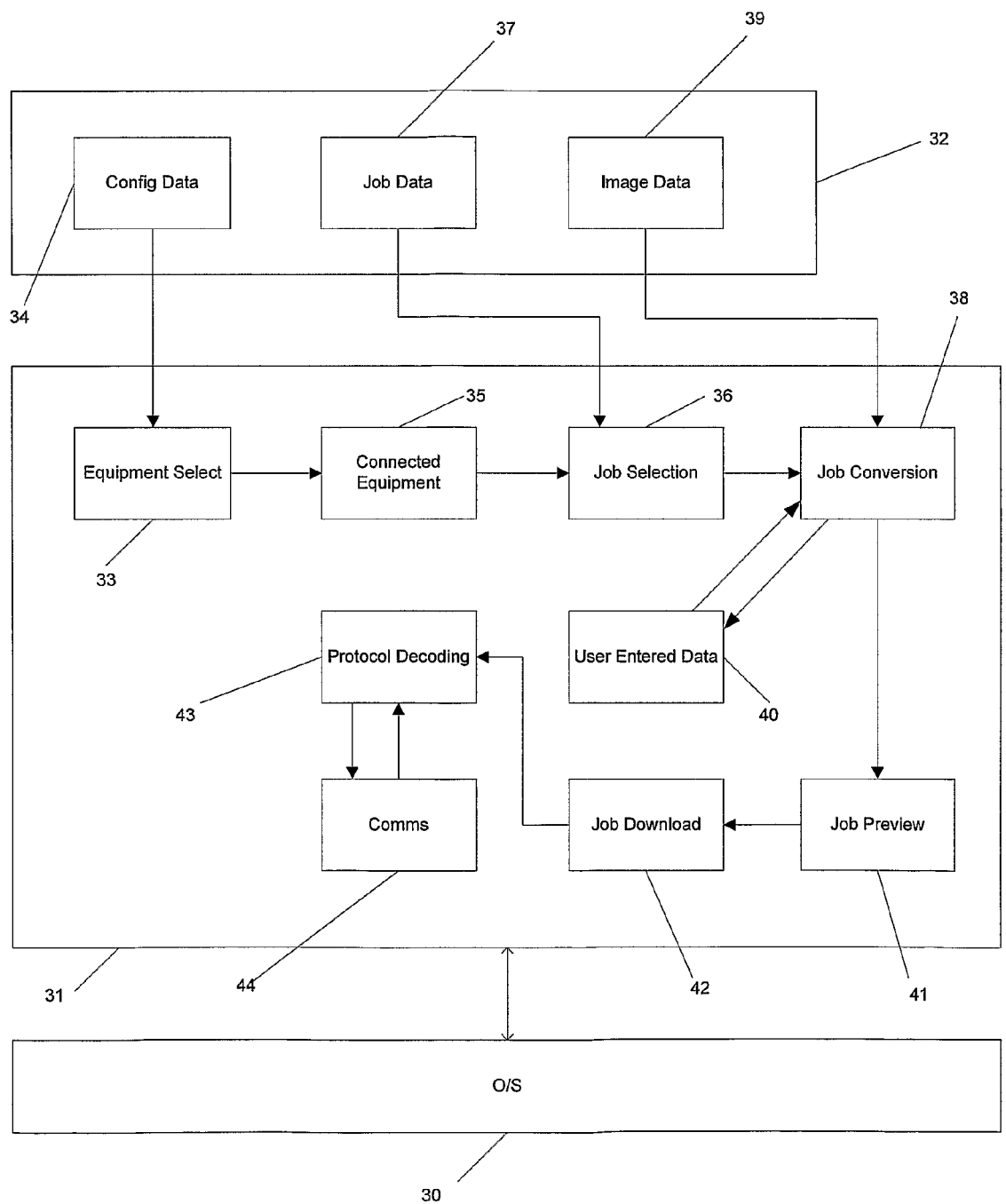
FIG. 4 is a schematic illustration of software components used in an embodiment of the present invention.

Referring now to FIG. 4, software components and data components used by the PDA 10 to control the printers 11, 12, 13 are described. It can be seen that the block diagram of FIG. 4 comprises three parts, an operating system part 30, a software module part 31 and a data part 32. The operating system part 30 represents the operating system software of the PDA 10 which in preferred embodiments of the invention is the Microsoft Pocket PC operating system. As is conventional, the operating system software provides various resource management functions, including control of input and output devices, and also control of communications, for example communications via the bluetooth interface 18.

The software module part 31 comprises a plurality of modules which allow data to be input and processed so as to cause the PDA 10 to control the printers 11, 12, 13. The software module part makes use of features of the operating system part 30 such as those described above, and also uses data stored in the data part 32. Modules of the software module part 31 are now described in outline. Their function is described in further detail below. An equipment select module 33 receives data identifying a printer on which printing is to take place, and reads appropriate configuration data 34 from the data part 32. A connected equipment module 35 is configured to establish bluetooth communication with the identified printer. A job selection module 36 is configured to allow selection of a print job which is to be carried out by the printing operation. The job selection module 36 uses job data 37 to determine details of the print job which is to be carried out. A job conversion module 38 uses data output from the job selection module 36, along with image data 39 to generate an image to be printed during the printing operation. The job conversion module 38 also communicates with a user entered data module 40 which prompts a user to enter data, and processes entered data. Data entered in this way is then incorporated in the image generated by the job conversion module 38.

An image to be printed generated by the job conversion module 38 is output to a job preview module 41, which presents a preview of the image to be printed to a user, on the touch screen 28 of the PDA 10. A job download module 42 causes a printing operation to be initiated by transferring the image data to the appropriate printer. This involves appropriate protocol decoding operations carried out by a protocol decoding module 43, before data to be communicated is passed to a communications module 44.

Having identified modules used to implement the described embodiment of the invention, operation of these modules to implement the embodiment of the invention is now described with reference to FIG. 5. At step S1, a user selects a printer on which printing is to take place using the equipment select module 33. At step S2 a connection with the selected printer is established using the connected equipment module 35. Having established a connection at step S2, a print job is selected at step S3 using the job selection module 36. The selected job is then prepared for printing at step S4 using the job conversion module 38. At step S5 a user is presented with a preview of the image to be printed using the job preview module 41. The image to be printed is then downloaded by the job download module 42 (step S6), using the protocol decoding module 43 and the communications module 44.

Figure 5:
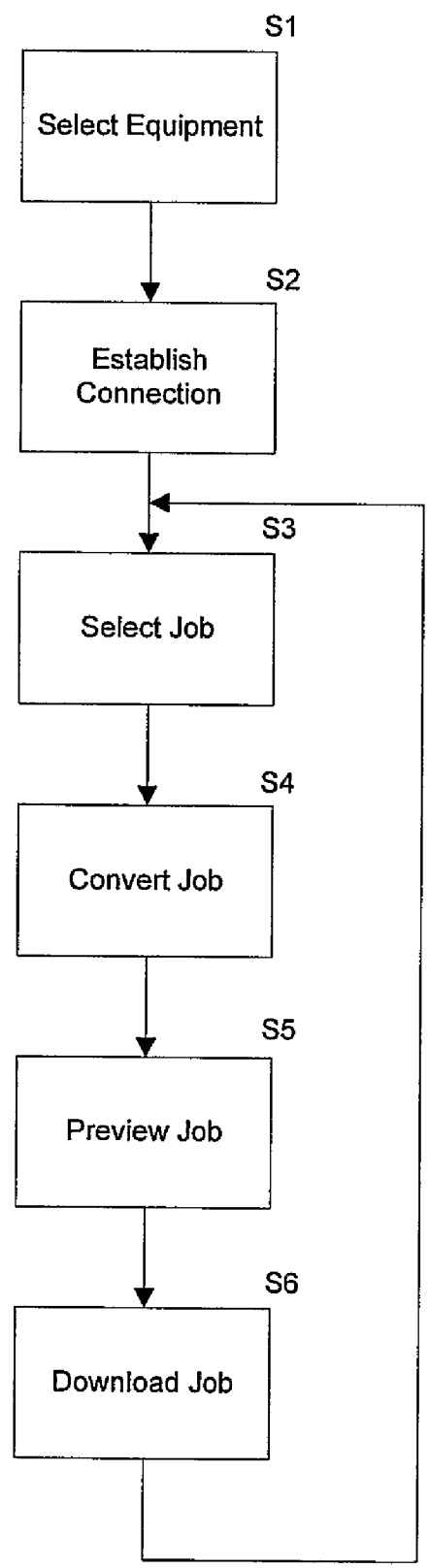
FIG. 5 is a flowchart showing an overview of processing carried out in an embodiment of the present invention.
Figure 6:
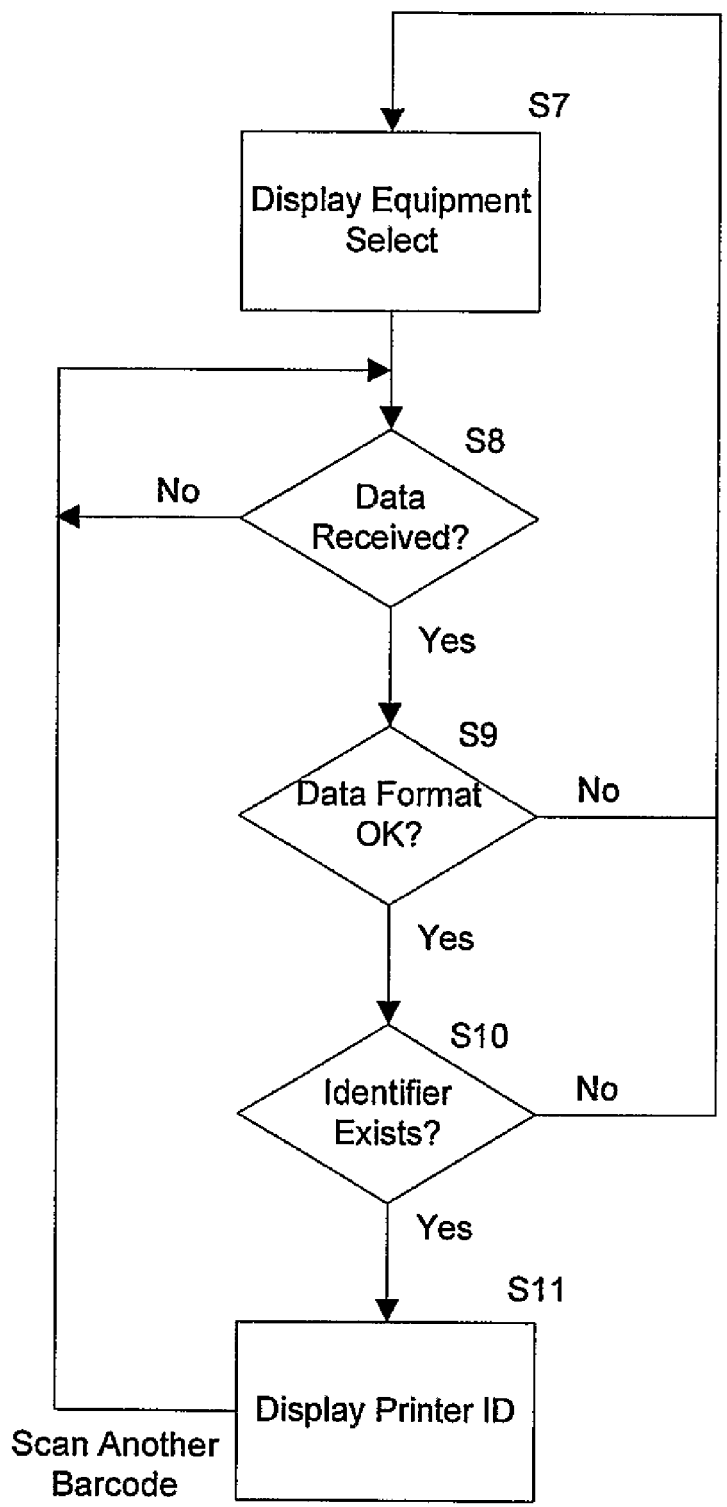
FIG. 6 is a flowchart showing part of the flowchart of FIG. 5 which selects a printer on which printing is to occur in further detail.
Figure 12:
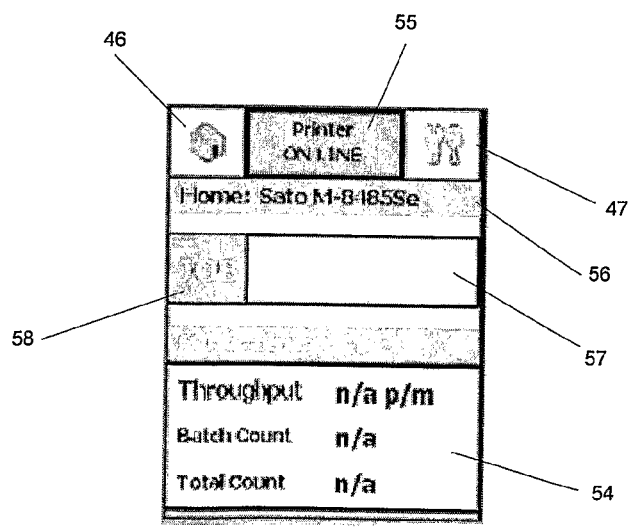
FIG. 12 is a screenshot of a screen displayed to a user after a connection is established in the flowchart of FIG. 10.

Referring now to FIG. 6, selection of equipment as shown at step S1 of FIG. 5 is described in further detail. At step S7 an equipment select screen is displayed to a user on the touch screen 28 of the PDA 10. The equipment select screen is shown in FIG. 7. It can be seen that the equipment select screen comprises a bluetooth status message 45 indicating that bluetooth communication is not currently established. The screen further comprises a home button 46 and a settings button 47. In the screen of FIG. 7, selection of the home button has no effect. However, as will be described below, the home button 46 appears on many screens, and in general causes display of a connected equipment screen which is shown in FIG. 12, and described below. The settings button 47 causes a screen to be displayed which can be used to set up the PDA 10. The screen further comprises a message 48 indicating that a barcode associated with a printer on which printing is to take place should be scanned using the barcode scanner 17, so as to identify the printer. An OK button 49 and a CANCEL button 50 are "greyed out" in the screen on FIG. 7 such that they cannot be selected by a user.

Having displayed the equipment select screen at step S7, a check is made to determine whether data has been received (step S8). Until data is received, processing remains at step S8. When data is received (i.e. when a barcode is scanned providing an identifier) processing continues at step S9, where a check is made to ensure that the scanned barcode is of a format associated with printer identification barcodes. If the check of step S9 is not successful, processing returns to step S7 where the equipment select screen of FIG. 7 is again displayed, and a user is prompted to scan another barcode.

If however the check step S9 is successful, the identifier associated with the scanned barcode is used to carry out a database lookup to identify the printer associated with the scanned barcode at step S10.

This database lookup uses a database implemented as a simple Windows config file, although it is will be appreciated that any form of datastore could be used. The database comprises a record for each printer as shown in FIG. 8. Each record comprises a Reference ID field which is an automatically generated identifier for the printer represented by that record. It is the Reference ID which is represented by the barcode affixed to the printer as described above. The database further comprises an Interface Device Address field which is a unique address used to establish communication with the printer represented by that record of the database. Given that the described embodiment of the invention uses bluetooth communication, a bluetooth addresses are stored in the Interface Device Address field. A Device ID field indicates a manufacturer or class of devices with which the printer represented by a record is associated. A Device Name field indicates a printer's model name or number, and a Display Name field indicates a user readable name for the printer.

Referring back to FIG. 6, at step S10, the database look up described above checks whether the scanned barcode corresponds to a value stored in the Reference ID field. If this is not the case (i.e. the PDA 10 is not configured to communicate with that printer), processing returns to step S7. If the database lookup locates a record of the database having a Reference ID field corresponding to the scanned barcode, appropriate configuration data for the printer is read from the database, and processing continues at step S11 where an equipment identification screen, shown in FIG. 9, is displayed on the touch screen 28.

Referring to FIG. 9, it can be seen that the equipment identification screen comprises the bluetooth status message 45, the home button 46 and the settings button 47 as described above. However, the screen now additionally comprises an area 51 indicating a name of the printer which has been identified from the scanned barcode. This area 51 is populated with data stored in the Display Name field of the database shown in FIG. 8. The screen of FIG. 9 further comprises an area 52 showing a message indicating that a user should use the OK button 49 (which is no longer "greyed out") to select a print job. Alternatively, a user can scan a further barcode, in which case processing returns to step S8 of FIG. 6. It should be noted that the CANCEL button 50 remains greyed out in the screen on FIG. 9, and therefore cannot be selected by a user.

Figure 10:
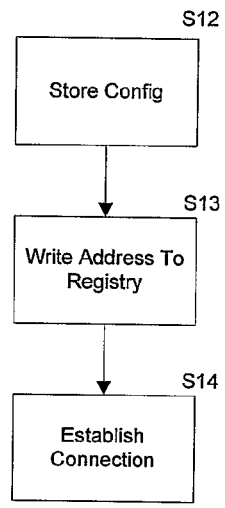
FIG. 10 is a flowchart showing part of the flowchart of FIG. 5 which establishes a connection between the PDA and the printer in further detail.

When the OK button 49 of the screen of FIG. 9 is selected by the user, processing passes to step S12 shown in FIG. 10, where the record of the database of FIG. 8 located in the database lookup of step S10 is copied to RAM. The bluetooth address is then taken from this data and stored within an appropriate key of the operating system registry (step S13) so as to allow the bluetooth connection between the PDA 10 and the appropriate printer to be established. A connection is then established at step S14. The establishment of the connection to the specified bluetooth address is controlled by appropriate operating system components.

Figure 11:
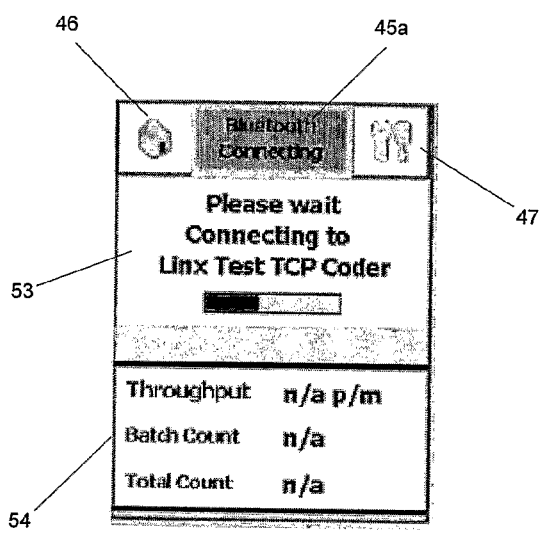
FIG. 11 is a screenshot of a screen displayed to a user before a connection is established in the Flowchart of FIG. 10.

FIG. 11 shows a screen displayed to a user during establishment of the bluetooth connection at step S14. It can be seen that this screen comprises a message 53 indicating that a connection is being established, and an area 54 indicating various performance parameters associated with the connection. It can be seen that a bluetooth status message 45a is now displayed, indicating that a bluetooth connection is being established. The home button 46 and the settings button 47 are displayed as described above When a connection is established, a connected equipment screen shown in FIG. 12 is displayed to the user. Here, it can be seen that the home button 46 and the settings button 47 are again displayed. However, given that a connection has been established, the bluetooth status message 45 of FIG. 11 has been replaced with an online message 55. An area 56 shows the user readable printer name with which a connection has been established, and the area 54 showing performance parameters is again included. An area 57 includes details of a print job to be printed, although in the illustration of FIG. 12, this area is not populated, because no job has yet been selected.

Figure 13:
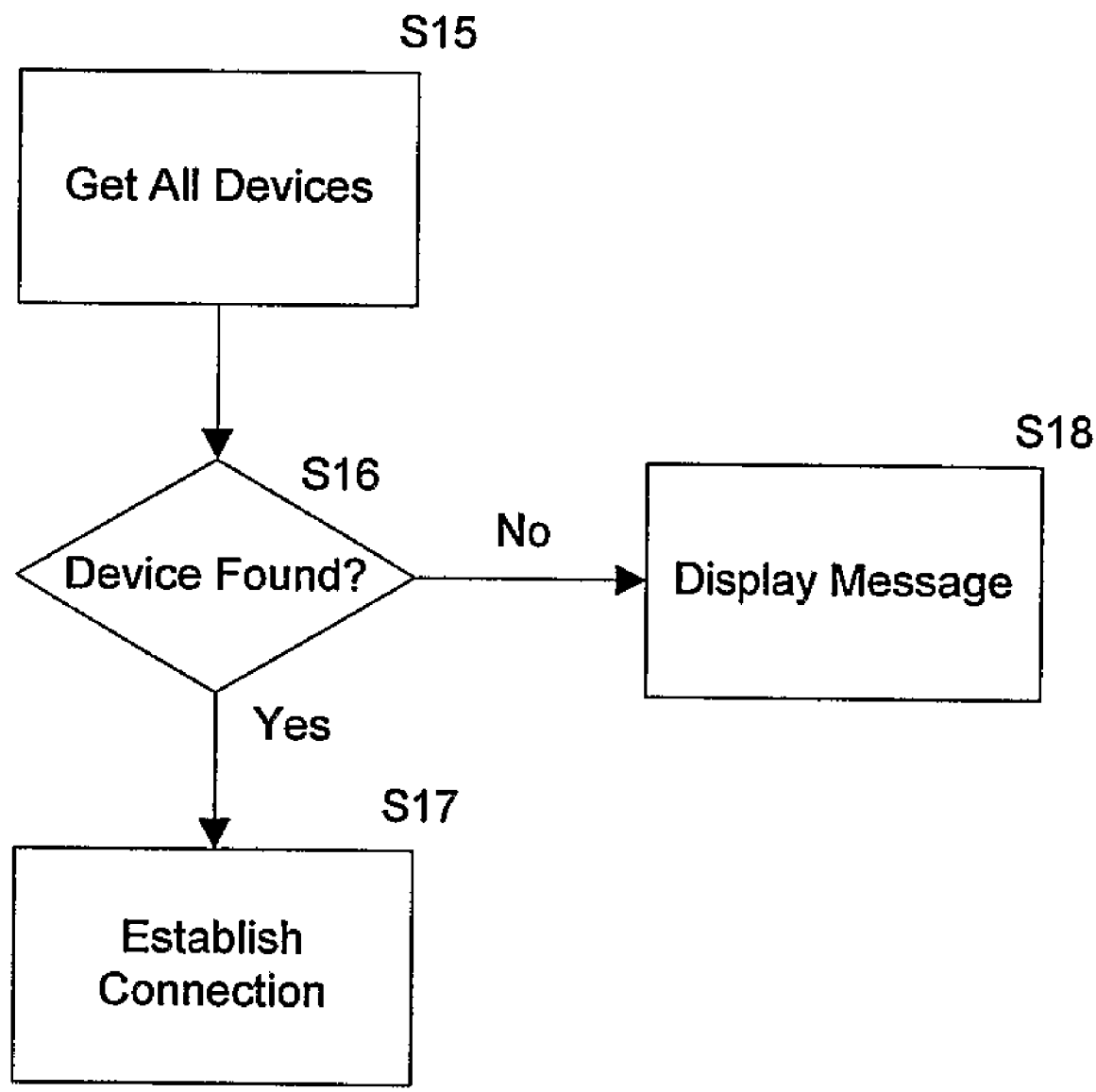
FIG. 13 is a flowchart showing part of the flowchart of FIG. 5 which establishes a connection between the PDA and the printer in an alternative embodiment of the invention.

FIG. 13 shows an alternative process for establishing a connection between the PDA 10 and a printer which is to be controlled to carry out a printing operation. At step S15 details of all bluetooth devices within range of the bluetooth interface 18 of the PDA 10 are obtained. A list of bluetooth devices within range (with associated addresses) is therefore created. At step S16 a check is made to determine whether the list of device addresses within range includes the address of the printer as read from the database at step S10 of FIG. 6. If the list does include the device address, a connection is established at step S17, and the screens of FIGS. 11 and 12 are displayed as described above. If the list does not include the required device address, an appropriate message is displayed to the user at step S18.

Having carried out the processing of FIG. 10 or FIG. 13, the PDA 10 is in communication with a printer which is to carry out a printing operation. Referring back to FIG. 5, it can be seen that the next required operation is job selection, which is carried out at step S3. This processing is initialised by a user selecting a job button 58 from the area 57 in the screen of FIG. 12. The processing is now described in further detail with reference to FIG. 14.

Figure 14:
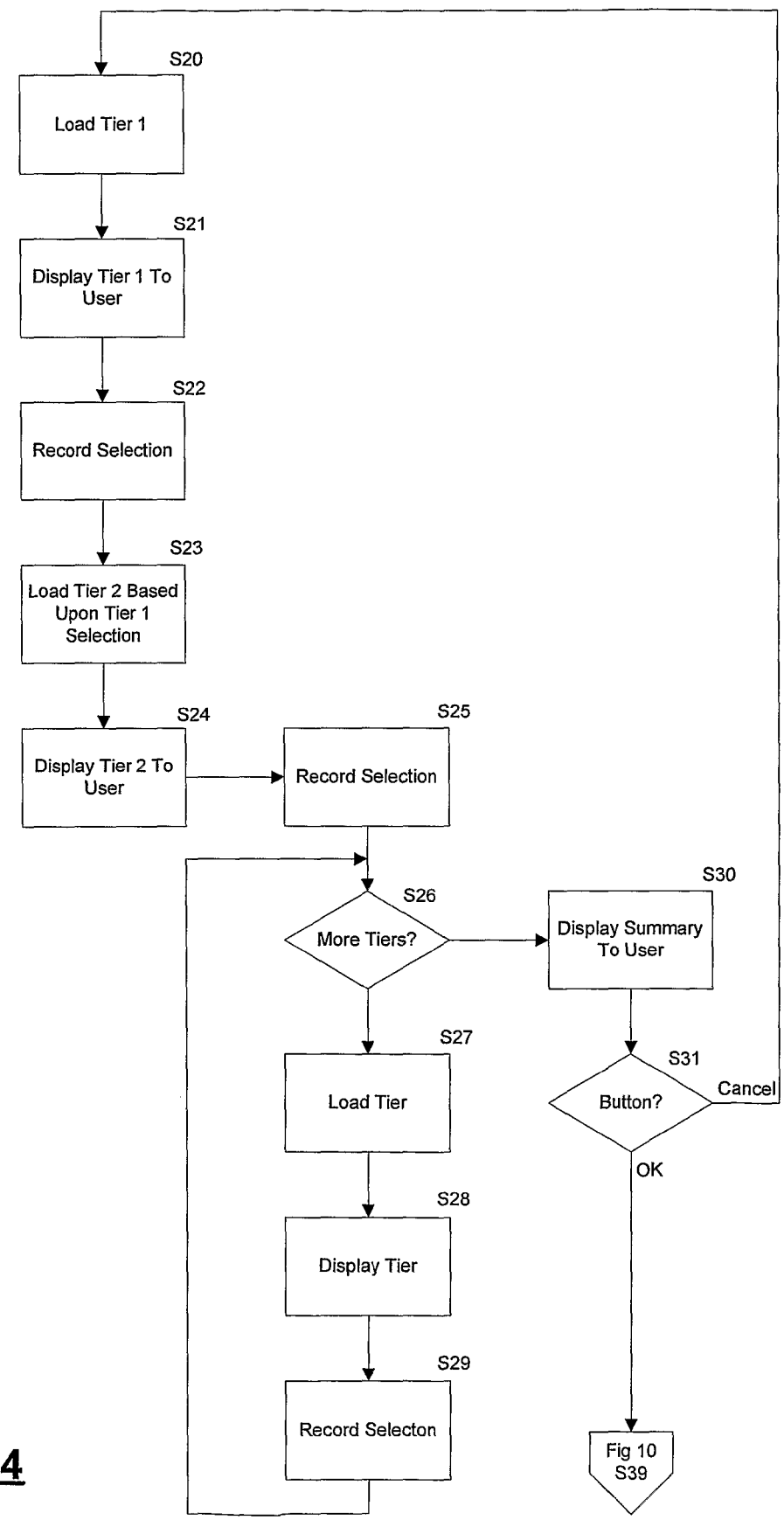
FIG. 14 is a flowchart showing part of the flowchart of FIG. 5 which selects a print job to be printed.

The processing of FIG. 14 provides a series of tiered menus from which a user selects a print job in terms of the packaging onto which printing is to take place, or the packaging onto which a label onto which printing is to take place is to be affixed. At step S20 a first menu is loaded into the memory of the PDA 10, and at step S21, this menu is displayed to the user, as shown in FIG. 15A.

Figure 15A:
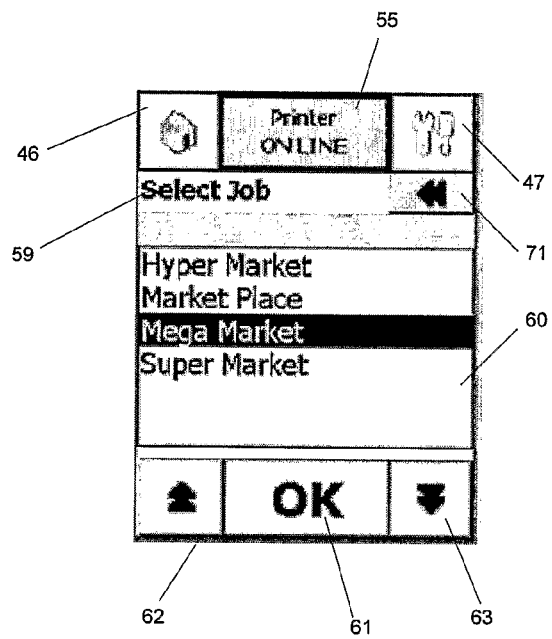
FIGS. 15A to 15E are screenshots of screens displayed to a user during the processing shown in FIG. 14.

Referring to FIG. 15A, it can be seen that this menu comprises the home button 46, the settings button 47 and the online message 55 described above. An area 59 provides an indication that the user is to select a job, and an area 60 displays a list from which a selection is to be made at this stage. It can be seen that entries in the area 60 relate to different retail outlets whose products are being packaged. One of the entries in the area 60 is selected by a user applying pressure to the touch screen 28 using a stylus or a finger in an appropriate position, and then selecting an OK button 61 again by applying pressure using a stylus or finger. Alternatively an entry in the area 60 may be selected using an up button 62, and/or a down button 63, and then selecting the OK button 61. The up button 62 and down button 63 are again selected by applying pressure to the touch screen 27, as described above.

Figure 15B:
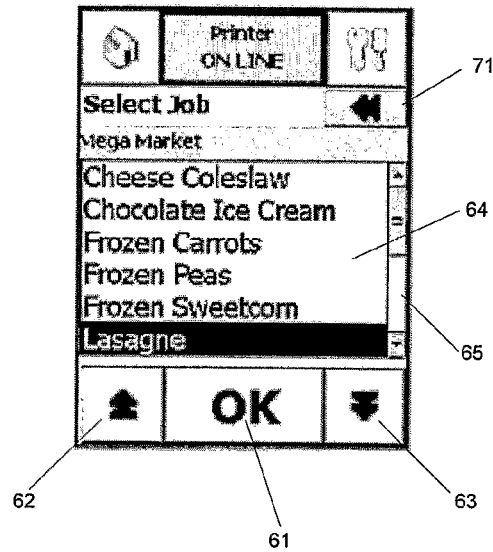

Referring back to FIG. 14, having displayed the screen shown in FIG. 15A at step S21, processing passes to step S22 where an appropriate user selection is made as described above, and recorded. At step S23 data required to display a second tier menu (determined with reference to the selection made from the menu of FIG. 15A at step S22) is loaded, and the second tier menu is then displayed at step S24. FIG. 15B shows this second tier menu. It can be seen that this menu has a structure similar to that of FIG. 15A, and like parts are not described further here. However it should be noted that the menu of FIG. 15B comprises an area 64 which displays a list of products which have associated printing operations. Again, a user can select an entry in the area 64, using a stylus or finger, and then use the OK button 61 to move forwards. Alternatively, selection can be effected through use of the up button 62 and the down button 63 as was described above, or using a scroll bar 65 to browse the whole list.

A product is selected from the menu from FIG. 15B at step S25 (FIG. 14), and processing continues at step S26. At step S26 a check is made to determine whether the product selection made at step S25 requires further a menu to be displayed. This can be determined by processing the selection made at step S25 with reference to a database to determine whether that selection has any associated menus. In this case, the selected product does have an associated menu, and processing therefore continues at step S27, where data pertinent to that menu is loaded, and an appropriate menu is then displayed at step S28.

Figure 15C:
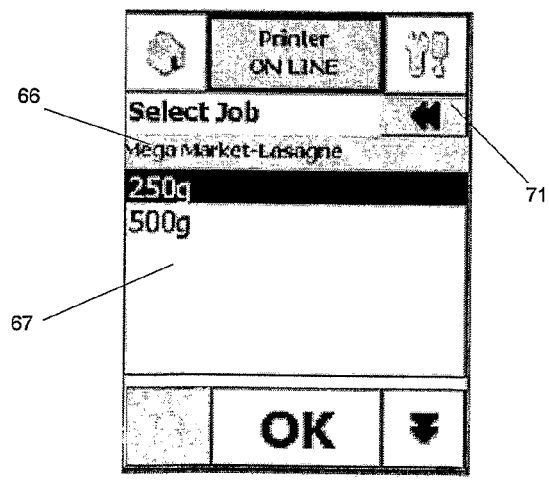
Figure 15D:
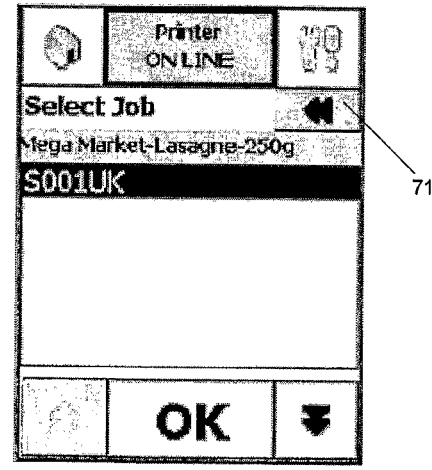

FIG. 15C shows the menu displayed at step S28, and it can be seen that it has a similar structure to the menus of FIGS. 15A and 15B described above. It can be seen that an area 66 shows details of selections made using the menus of FIGS. 15A and 15B. An area 67 comprises a plurality of entries indicating sizes in which the product selected using the menu of FIG. 15B is sold. One of these size entries is selected in the manner described above, at step S29 of FIG. 14.

Figure 15E:
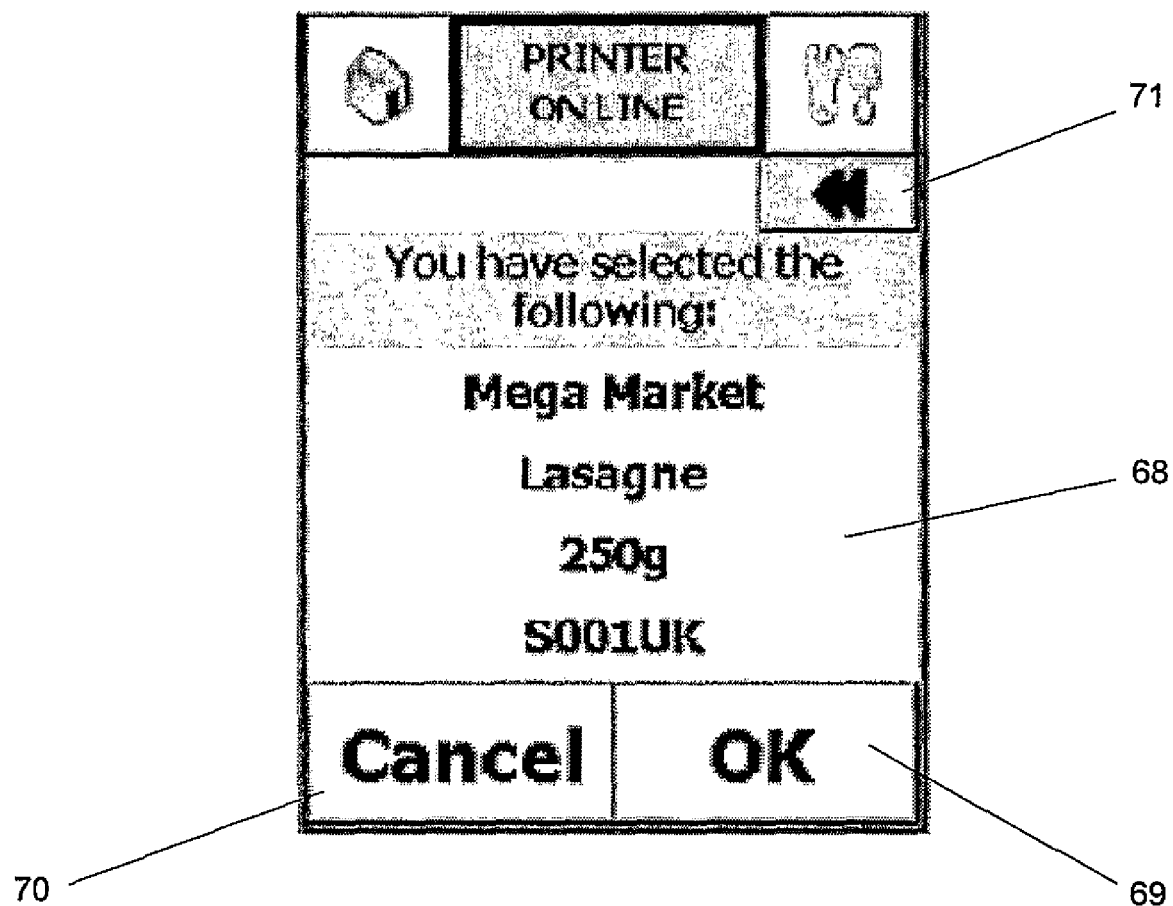

Processing then returns to step S26 where a check is made to determine whether further menus are to be displayed. In this case, further menus are to be displayed, and processing passes through steps S27 to S29 as described above, resulting in display of the menu shown in FIG. 15D. This menu comprises a single entry which represents a unique product code for the product onto which printing is to occur. An entry is selected from this menu as described above, and processing then returns to step S26. Here, the check of step S26 determines that no further menus are to be displayed, and processing therefore continues at step S30, where a summary of the product selected is displayed to the user, as shown in FIG. 15E. It can be seen that the screen of FIG. 15E includes an area 68 in which a summary of the selected product is displayed. An OK button 69 can then be selected at step S31 to cause further processing as is described below. If a CANCEL button 70 is selected at step S31, the selections made using the menus of FIGS. 15A to 15D are discarded, and processing returns to step S20.

It should be noted that each of the screens of FIGS. 15A to 15E includes a back button 71 which causes the most recent selection to be discarded, and the previous menu to be displayed. For example, selection of the back button 71 in the menu of FIG. 15B displayed at step S24 will cause processing to return to step S21 where data for the menu of FIG. 15A is again loaded, and processing then continues as described above. It will be appreciated that selection of the back button 71 from any of the other menus has corresponding effect.

Figure 16:
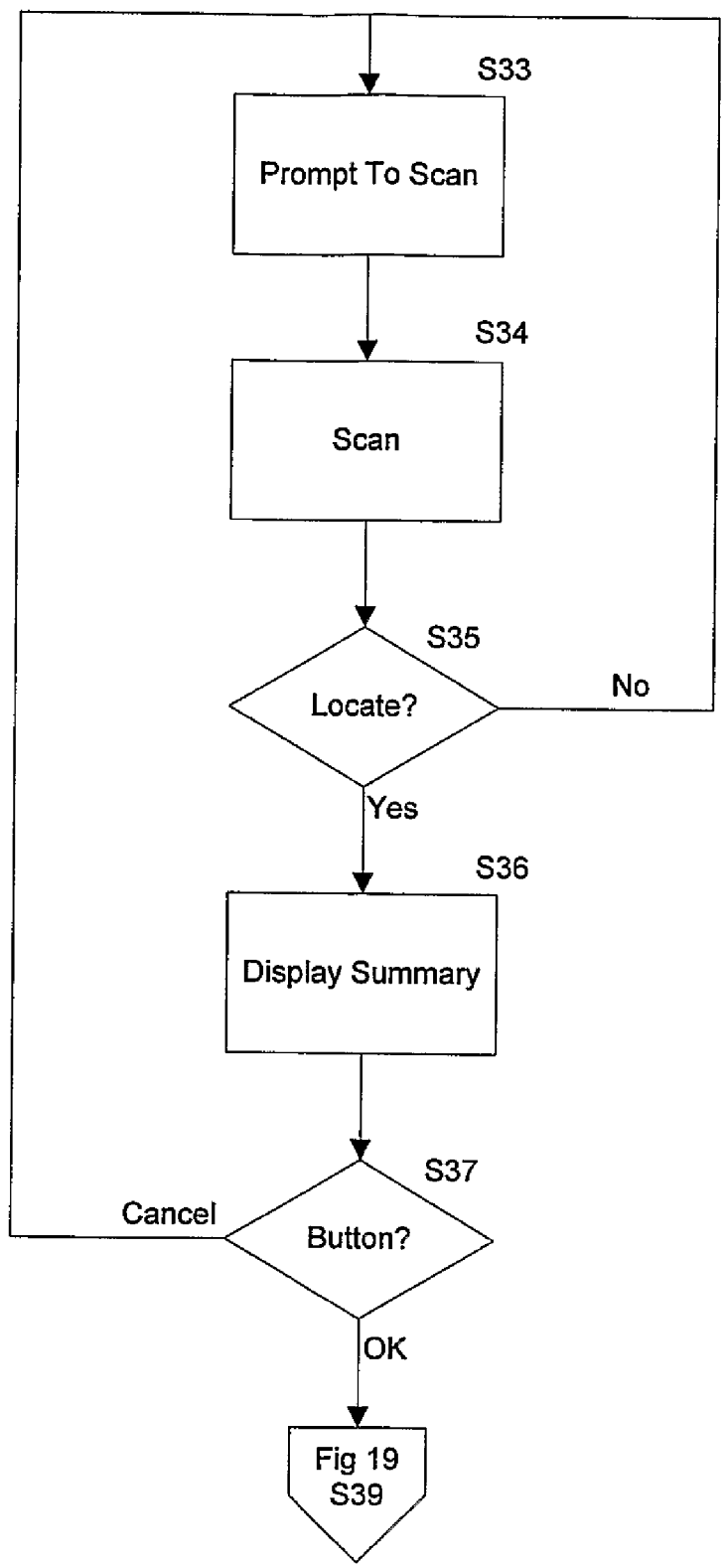
FIG. 16 is a flowchart showing alternative processing to that shown in FIG. 14 which operates to select a job to be printed.

In alternative embodiments of the present invention, the tiered menus of FIGS. 15A to 15D are not used. Instead, processing as shown in FIG. 16 is carried out. At step S33 a screen is displayed to the user prompting the user to select a barcode uniquely identifying the print job to be carried out. This barcode can be read either from the packaging of the product onto which printing is to take place, or alternatively from a job sheet. The barcode is read at step S34, and the read barcode is used to perform a database lookup at step S35. If this lookup is not successful processing returns to step S33 where the user is prompted to scan a further barcode. Otherwise, processing continues at step S36, where a summary of the print job is displayed to a user, using the screen shown in FIG. 15E. At step S37 a user selects either the OK button 69 or the CANCEL button 70 displayed on the screen of FIG. 15E. This selection is processed at step S37. If the OK button 69 is selected processing continues at step S38, otherwise, if the CANCEL button 70 is selected, processing returns to step S33.

The use of barcodes for print job identification is preferred in some embodiments of the present invention given that it minimises the need for user input, and also minimises user input errors.

In still alternative embodiments of the invention, the processing of FIGS. 14 and 16 is replaced by user input of a unique product code (such as that shown in the menu of FIG. 15D), whereupon a summary similar to that shown in FIG. 15E is displayed to the user.

Figure 17:
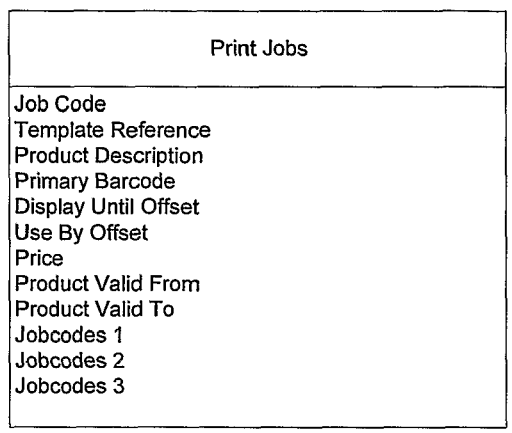
FIG. 17 is a schematic illustration of a database used to generate an image to be printed.

FIG. 17 shows a database used in the processing described above, and processing which is described in further detail below. It can be seen that each database record comprises a Job Code field which provides a unique identifier for each job. A Template Reference field indicates a template which is used for the print job, the template indicating data to be printed as part of that print job. The use of such templates is described in further detail below. Each record further includes a Product Description field which stores a textual description for the product associated with that print job. A Primary Barcode field stores data indicating a barcode associated with the print job. Display Until Offset and Use By Offset fields are used to allow software operating on the PDA 10 to automatically calculate display until and use by dates, by simply applying the specified offset to the date of printing. Each record also includes a Price field, alongside Product Valid From and Product Valid To fields which specify dates between which the print job can take place.

Each record of the database shown in FIG. 17 further comprises three Job Codes fields which are used to enable tiered job selection of the type described above.

The three Job Codes field are used as follows in order to generate the tiered menu selection screen shown in FIGS. 15A to 15D. The fields of the database shown in FIG. 17 are first sorted with reference to the first Job Codes field. Having carried out such a sorting operation, different values of the first Job Codes field are displayed to the user in the first tier menu screen. When a selection is made from the first tier menu screen, records of the database associated with that selection (i.e. having an appropriate first job code field value) are sorted with reference to the second Job Codes field value, and different values are again displayed to the user. Having made a selection from the second Tier menu, a similar process is carried out in order to display the third tier menu.

When using tiered menus as described above, it will be appreciated that where a tier has only a single entry, software operating on the PDA 10 may be configured so as to prevent display of that menu, and simply automatically make the selection of that single entry without requiring user input.

Either by using the tiered menu selection described above, or by scanning a barcode or inputting an appropriate identifier, a record of the database of FIG. 17 is uniquely identified. Use of this uniquely identified print job to initiated is now described in outline with reference to FIG. 18, with a more detailed described being presented with reference to FIG. 19.

Figure 18:
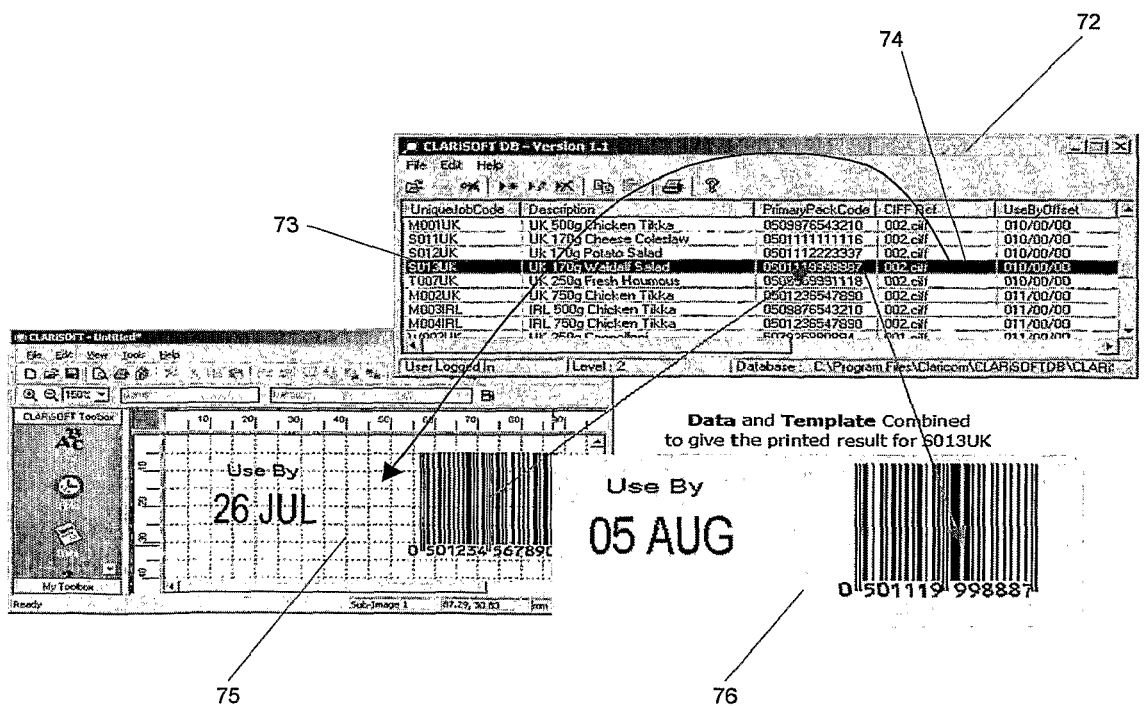
FIG. 18 is a schematic illustration showing how the database of FIG. 17 is used to generate an image to be printed.

Referring to FIG. 18, a first window 72 shows database records of the type described above with reference to FIG. 17. A record 73 of the records shown in the window 72 is identified by its unique identifier using techniques such as those described above. A template reference 74 associated with the record 74 is used to locate a template file 75 associated with the print job. The template file 75 specifies what is to be included within the printed image, together with appropriate layout information. The template file 75 also specifies data which should be read from appropriate fields of the record 73 (e.g. price). Thus, an image to be printed 76 is generated by identifying and populating the template 75. It should be noted (as is described in further detail below) that the generated image 76 is at this stage held in a form which is independent of any particular printer.

Figure 19:
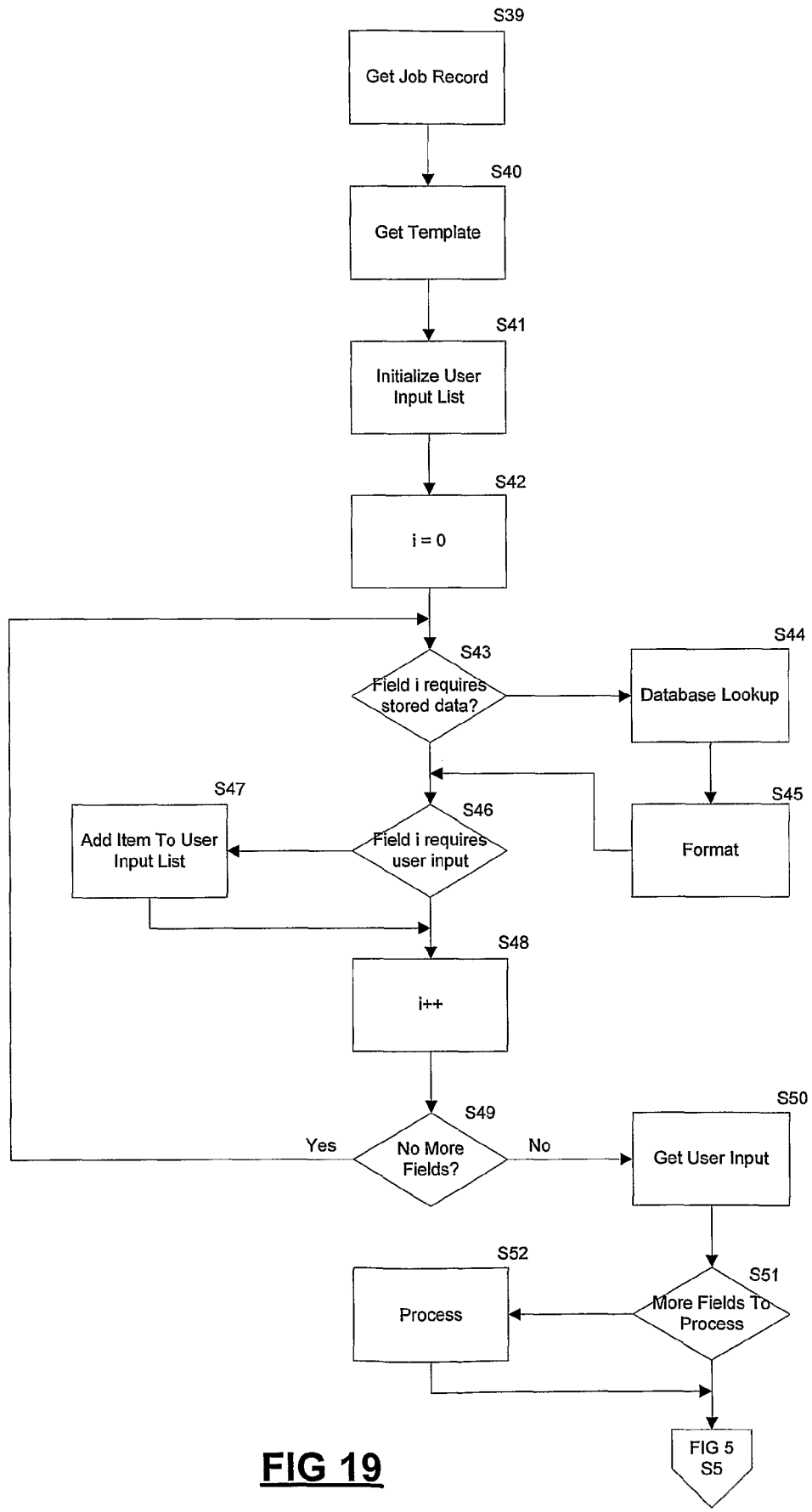
FIG. 19 is a flowchart showing part of the flowchart of FIG. 5 which generates an image to be printed in further detail.

The processing outlined with reference to FIG. 18 is now described further with reference to the flowchart of FIG. 19. At step S39 a job record identified as described above is read from the database described with reference to FIG. 17. At step S40 a template identified by that record is read. At step S41 a list of items requiring user input is initialised, and at step S42 a counter which is to count through all fields included in the template loaded at step S40 is initialised to zero. At step S43 the field of the template associated with the current value of the counter variable is processed, and a check is made to determine whether this field has associated data indicating that data should be obtained from the database of FIG. 17. If this is the case, data is obtained at step S44, and formatted in accordance with a specification included within the template at step S45. Processing then continues at step S46. If the check of step S43 determines that no database look up is required, processing passes directly to step S46.

At step S46 a check is carried out to determine whether user input is required to populate the field of the template which is currently being processed. If such data is required, appropriate data is added to a list of user input required at step S47, and processing then continues at step S48. If no user input is required, processing passes directly from step S46 to step S48.

At step S48, the counter variable is incremented, and a check is then carried out at step S49 to determine whether the template includes further fields which are to be processed. If this is the case, processing returns to step S43. Otherwise, processing continues at step S50 where user input is obtained, as indicated by the list populated at step S47. Obtaining of user input is described in further detail below.

Having obtained user input, processing continues at step S51 where a check is made to determine whether further fields require processing. Such fields requiring processing at this stage will be fields which could not be properly processed at step S44. Specifically, some fields may be automatically populated based upon values of other fields which are populated at either at step S44 or step S50. Suitable processing to populate such fields is carried out at step S52, and then processing passes to step S5 (FIG. 5). If no such processing is required, processing passes directly to step S5.

Figure 20:
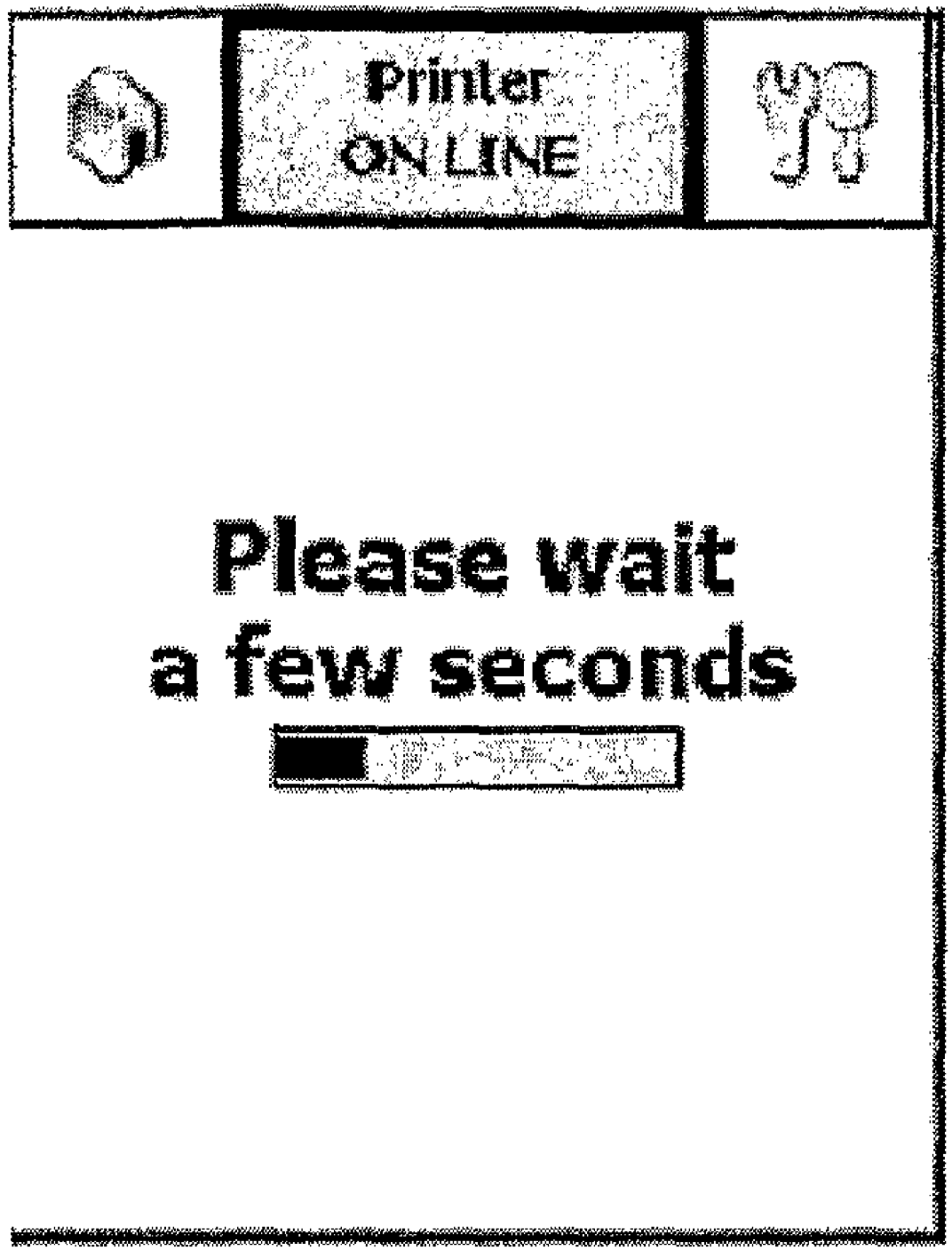
FIG. 20 is a screenshot of a screen displayed during processing of FIG. 19.

It will be appreciated that the processing of steps S39 to step S49 may take some time. Therefore, while this processing is taking place, an appropriate message is displayed to the user, as shown in FIG. 20.

Figure 21:
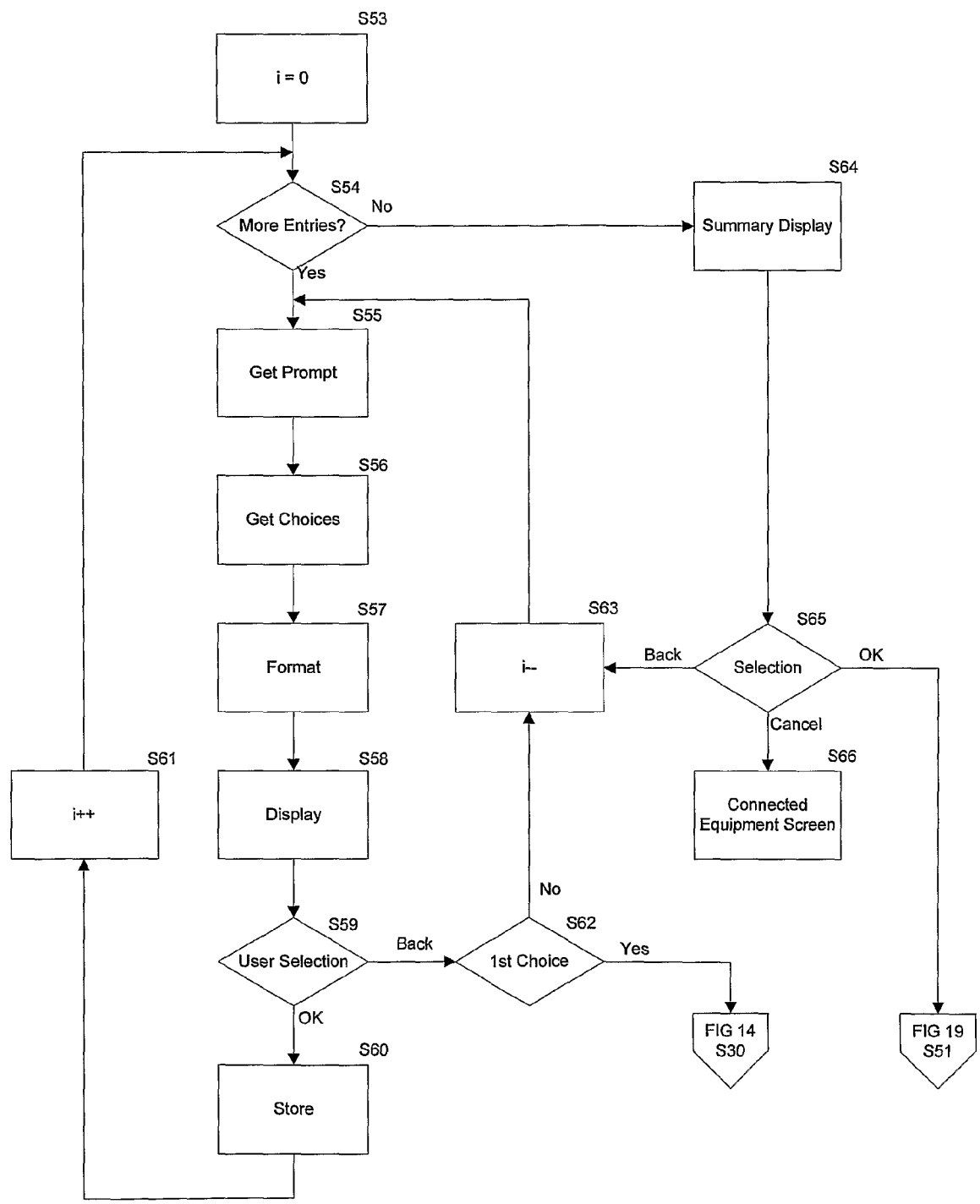
FIG. 21 is a flowchart showing part of the flowchart of FIG. 19 which handles data input by a user to be included in the image to be printed.

Processing of step S50 concerned with obtaining user input is now described in further detail with reference to the flowchart of FIG. 21. At step S53 a counter variable which is to count through elements of the list of user input required is initialised, and a check is carried out at step S54 to ensure that further entries remain to be processed. Assuming that further entries remain to be processed, processing continues at step S55.

Figure 22A:
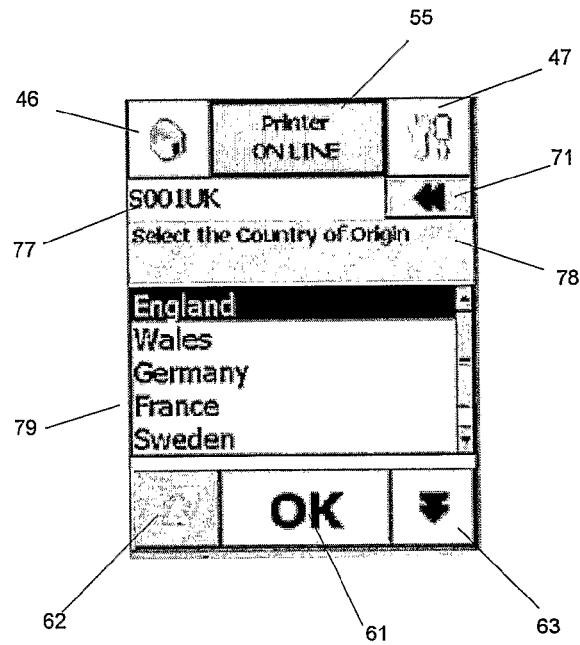
FIGS. 22A to 22C are screenshots of screens displayed to a user during the processing shown in FIG. 21.

For each user input item required, the processed template will specify a prompt indicating to a user the nature of the required information, together with data indicating possible values for that information. At step S55 the prompt to be displayed to the user is obtained, and at step S56 possible values for that information are obtained, and the information obtained at steps S55 and S56 is formatted at S57. The formatted information is then displayed to the user at step S58. A screen displayed to the user at step S58 is shown in FIG. 22A. It can be seen that this screen comprises the online message 55, the home button 46 and settings button 47 described above. The screen further comprises an area 77 indicating a product associated with the currently processed print job, together with an area 78 which provides the prompt obtained at step S55 indicating the required user input. An area 79 provides a list of possible values for the user input data, which were obtained at step S56. A value in the area 79 can be selected using a stylus or finger as described above, or by using the up button 62 and down button 63 as described above. When an appropriate entry has been selected in the area 79, the OK button 61 is used to confirm the user's selection. Selection of the OK button 61 is detected at step S59 of FIG. 21, and processing then continues at step S60 where the user input value is stored. The counter variable is then incremented at step S61, and processing then returns to step S54.

Figure 22B:
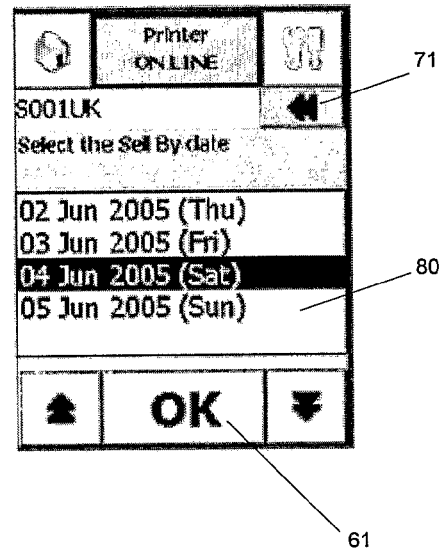

The processing described above is repeated for each field of the template requiring user input. For example, FIG. 22B shows a screen which is used to prompt a user to input a Sell By Date. In this example, records of the database 17 specify limits for sell by date based upon a current date. Possible dates computed using these limits are displayed to the user in an area 80 of the screen of FIG. 22B, and can be selected as described above.

It should be noted that instead of selecting the OK button 61 of the screens of FIGS. 22A and 22B, a user may at step S59 select the back button 71. When the back button is selected, processing passes to step S62 where a check is made to determine whether the back button 71 has been selected from the first user input screen. If this is the case, user input processing is terminated, and processing passes to step S30 of FIG. 14. Otherwise (i.e. the back button 71 was not selected from the first user input screen), processing passes to step S63 where the counter variable is decremented, and processing then passes to step S55 where processing is carried out to display the previous user input screen.

Figure 22C:
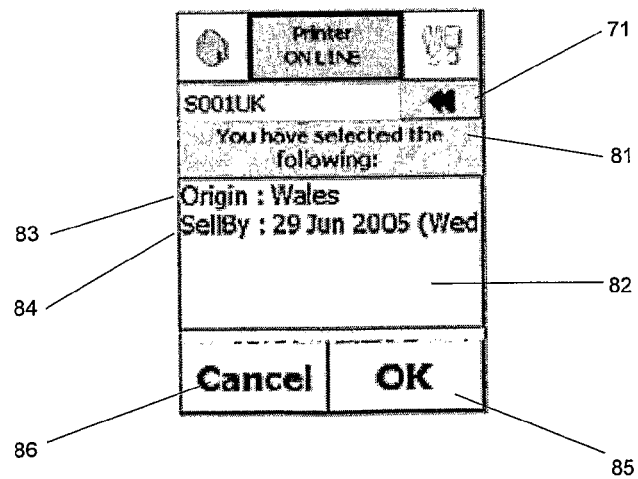

When all user input items have been obtained (i.e. when the check of step S54 is not satisfied), processing passing to step S64 where a display of all user input items is presented, as shown in FIG. 22C. It can be seen that this screen comprises an area 81 indicating to a user that an area 82 displays the user entered data. In the area 82, the data comprises two lines. A first line 83 shows data entered using the screen of FIG. 22A, while a second line 84 shows data entered using the screen of FIG. 22B. User selection is processed at step S65. Selection of an OK button 85 causes processing to continue at step S51 of FIG. 19. Selection of a CANCEL button 86 causes set up of the current print job to be terminated, and the connected equipment screen of FIG. 12 to be displayed at step S66. If the back button 71 is selected, processing passes to step S63, and continues as described above.

Figure 23:
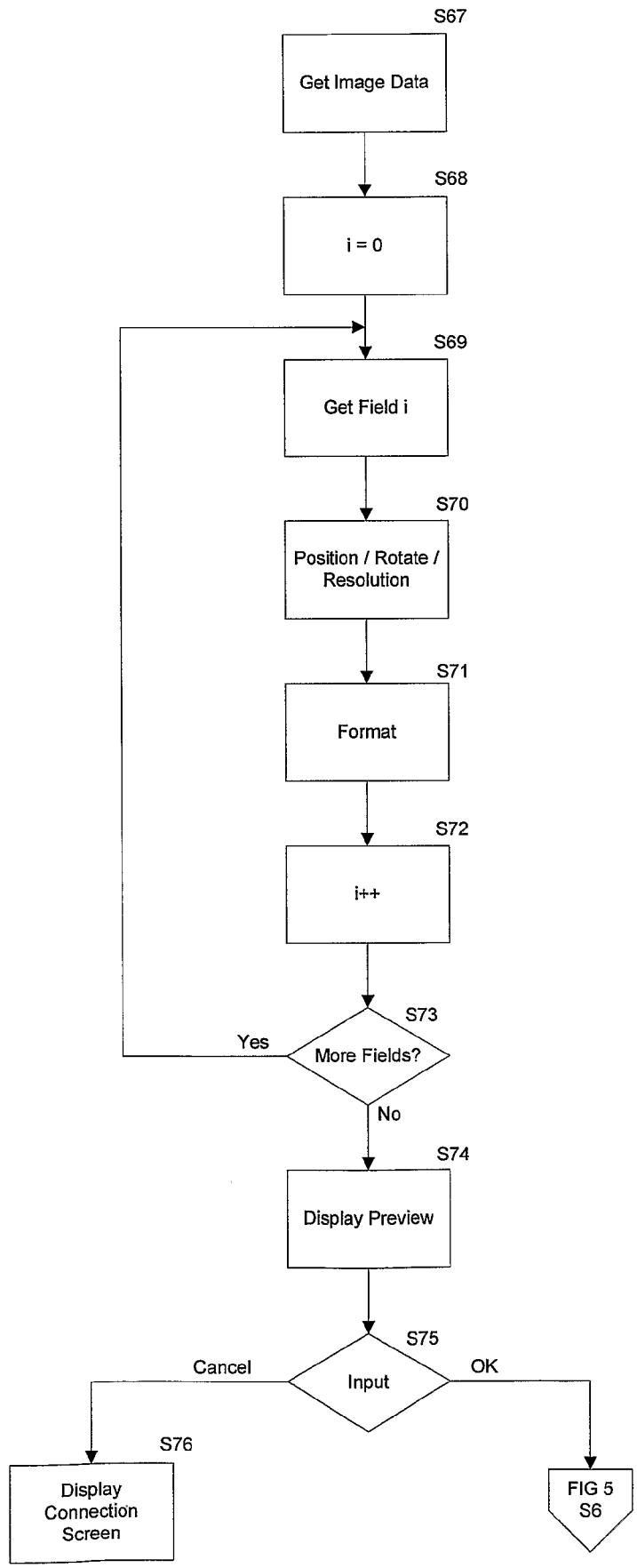
FIG. 23 is a flowchart showing in further detail part of the flowchart of FIG. 5 which provides a preview of the image to be printed.

Referring back to FIG. 19, it will be recalled, that when all fields of the template have been appropriately populated, processing continues at step S5 of FIG. 5 where a preview of the print job is displayed. This processing is now described in further detail with reference to FIG. 23.

Figure 24:
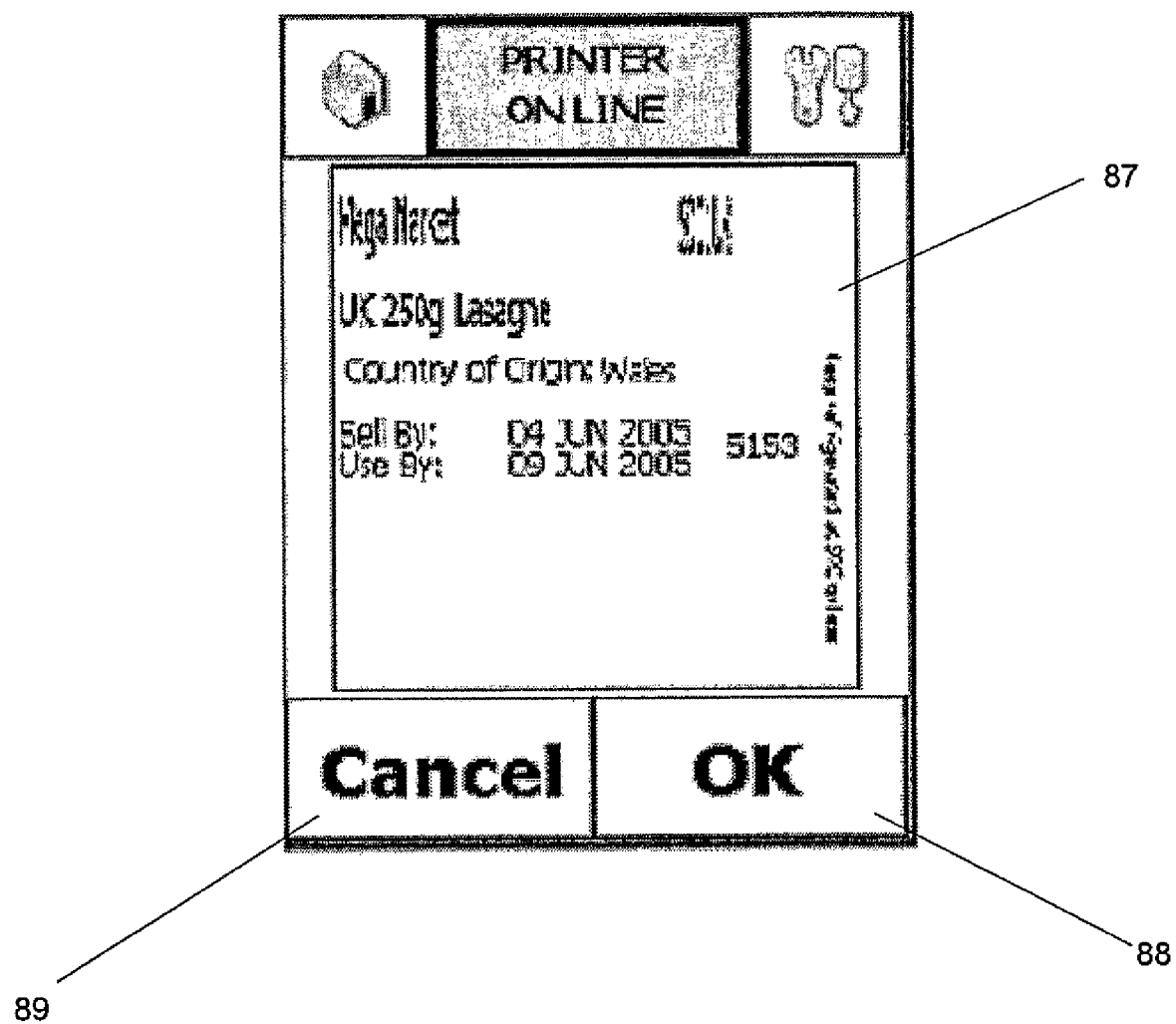
FIG. 24 is a screenshot of a screen displayed during the processing of FIG. 23 which includes a preview of the image to be printed.

At step S67 the image data generated by the processing of FIG. 19 is obtained. At step S68 a counter variable which is to count through fields of the image is initialised. At step S69 the field indicated by the counter variable is obtained from the generated image data, and at step S70 the field is processed with respect to its rotation, position and resolution. At step S71, the field is formatted for display to the user. At step S72 the counter variable is incremented, and at step S73 a check is carried out to determine whether further fields are to be processed. If the check is satisfied, processing returns to step S69. Otherwise, when all fields have been processed, a preview of the image is displayed at step S74. The preview as displayed to the user is shown in FIG. 24. It can be seen that the preview is displayed in an area 87. An OK button 88 and a CANCEL button 89 are also provided. User selection of either the OK button 88 or the CANCEL button 89 is received at step S75. If the CANCEL button 89 is selected, the connected equipment screen of FIG. 12 is displayed. Otherwise processing continues at step S6 of FIG. 5.

Having carried out the processing of steps S1 to S5 of FIG. 5 it will be realised that a connection has been established with a printer which is to be used for printing, and the image to be printed has been generated. However, it is to be noted that the PDA 10 processes images in the manner described above in a printer independent format. That is, the three printers 11, 12, 13 may each of different command protocols, although the processing described above would have been carried out in a printer independent protocol regardless of the printer to be used. This simplifies the processing described above, as regard need not be given to the printer to be used.

Figure 25:
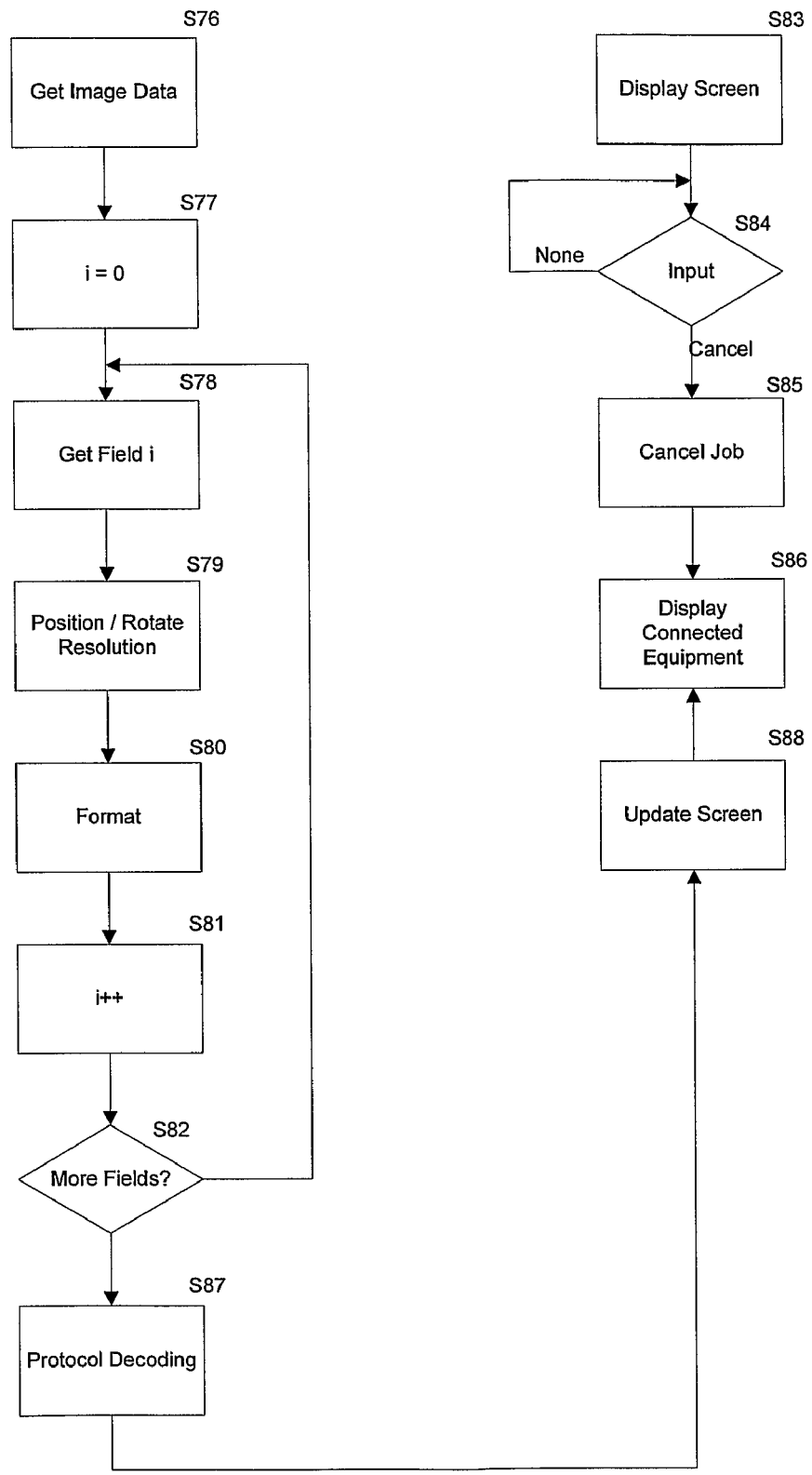
FIG. 25 is a flowchart showing in further detail part of the flowchart of FIG. 5 which prepares image data for printing.
Figure 27:
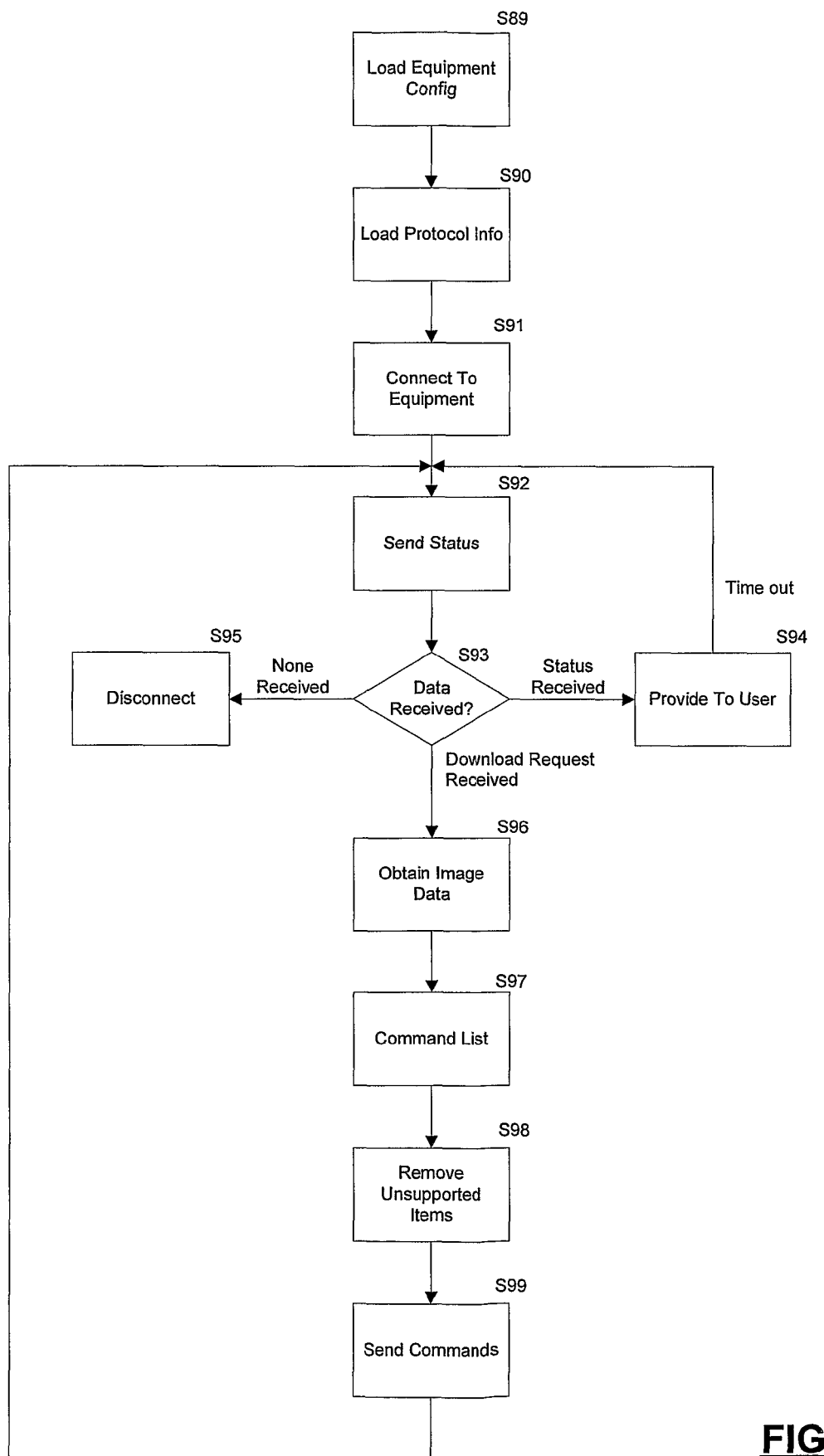
FIG. 27 is a flowchart showing how image data is converted into a form usable by the printer on which printing is to take place prior to being transmitted to the printer.
Figure 28:
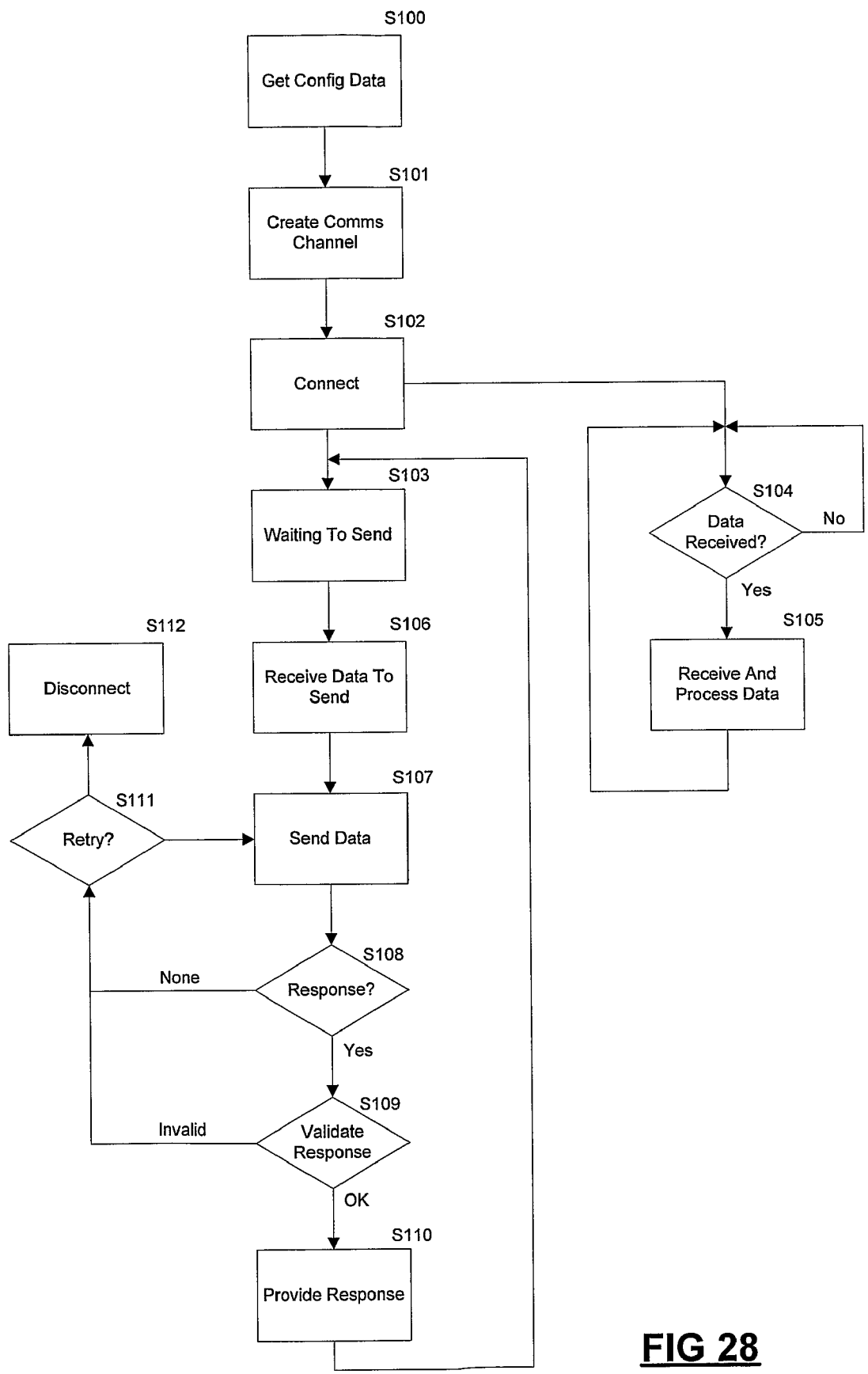
FIG. 28 is a flowchart showing communication between the PDA and printer in further detail.

However, given that the image to be printed has now been prepared in the printer independent format, it is now necessary to appropriately convert the prepared image into commands understood by the printer to be used, prior to downloading these commands to the printer. This process is now described in further detail. FIG. 25 shows how image data is prepared for download, FIG. 27 shows how image data is translated, and FIG. 28 shows the communication process in further detail.

Referring to FIG. 25, at step S76 image data to be downloaded to the printer for use in a printing operation is obtained. At step S77 a counter variable which is to count through all fields of the image to be printed is initialised. Steps S78 to S80 then process the field indicated by the counter variable. Specifically, at step S78 the field data is obtained, it is positioned, rotated and its resolution determined at step S79, and formatted for printing at step S80. At step S81 the counter variable is incremented, and step S82 then determines whether further fields remain to be processed, if this is the case, processing returns to step S78 where a subsequent field is processed. Thus, it can be seen that the processing of steps S78 to S82 processes each field in turn.

Figure 26:
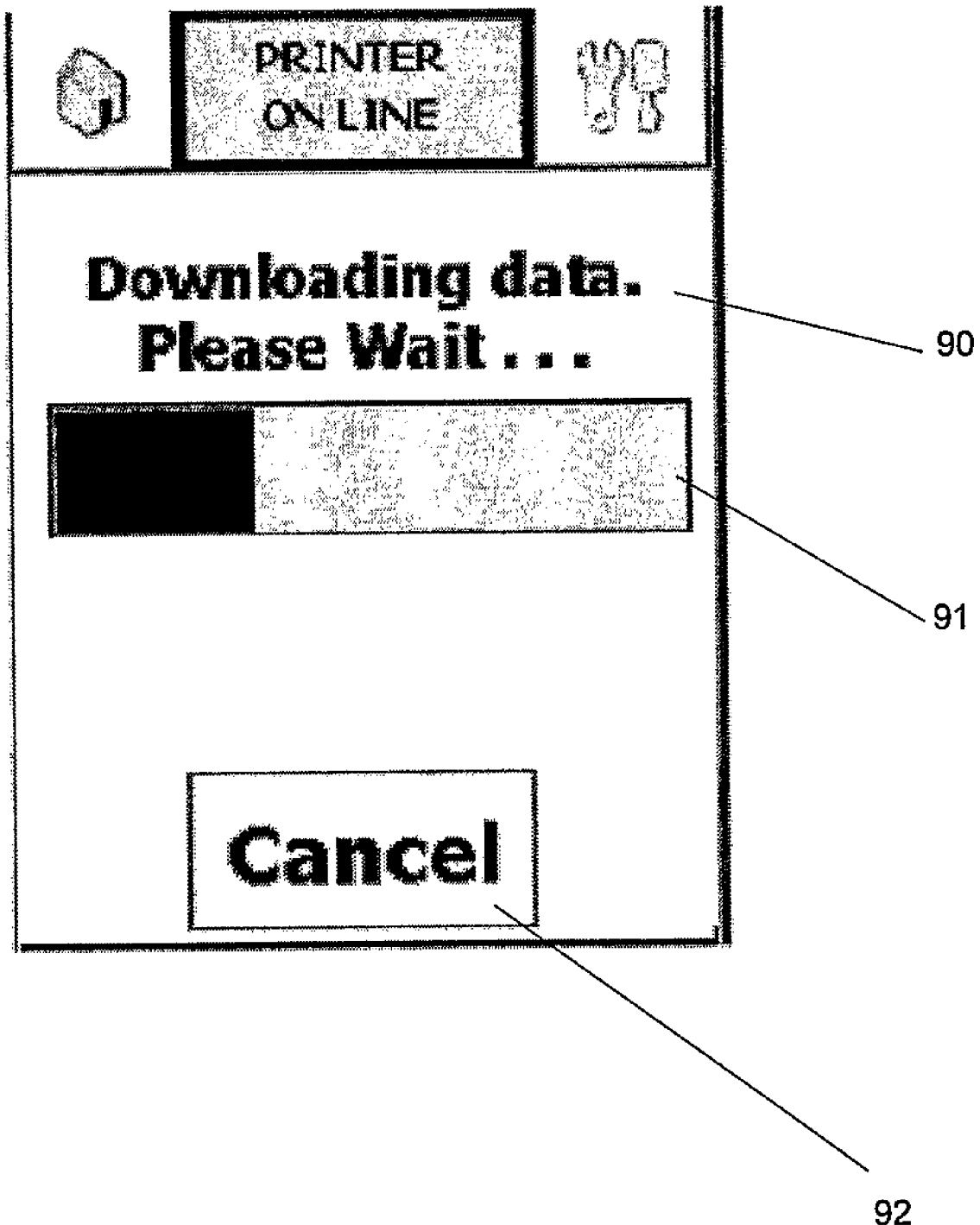
FIG. 26 is a screenshot of a screen displayed to a user during the processing of FIG. 25.

In parallel with the processing of steps S76 to S82, an information screen is displayed to the user at step S83. This screen is shown in FIG. 26. It can be seen that the screen of FIG. 26 comprises an area 90 in which a message is displayed to the user indicating that data is being downloaded, together with a status bar 91 indicating process of the download. The screen of FIG. 26 includes a CANCEL button 92, selection of which is processed at step S84. When selected, downloading is cancelled at step S85, and the connected equipment screen of FIG. 12 is displayed at step S86.

When all fields have been processed by steps S78 to S82 (and assuming that the CANCEL button 92 has not been selected), processing passes from step S82 to step S87 where protocol decoding takes place, converting the image to be printed into commands to cause the specified printer to carry out printing operations which are to be provided to the appropriate printer. This decoding is described in further detail with reference to FIGS. 27 and 28 below. When appropriate decoding and provision of commands has taken place, processing passes to step S88 where a screen shown in FIG. 29 is displayed. It can be seen that the screen of FIG. 29 has a form similar to that of FIG. 12, although here the area 57 shows details of the job which has been provided to the printer.

Referring now to FIG. 27, at step S89 configuration data for the printer to be used is loaded. This can conveniently be achieved by reading appropriate data from the data store as described above. At step S90, information indicating a command protocol to be used by the printer is loaded. This can be determined from data stored in the data store described above, possibly obtaining further protocol information by performing a supplementary look up.

Having loaded appropriate protocol information, a connection is established between the PDA 10 and the printer which is to be controlled at step S91. This connection process is described in further detail below. Having established a connection, status information is transmitted to the printer at step S92. Step S93 processes received information. When status information is received, processing passes to step S94 where it is provided to a user, and processing then returns to step S92. If no status information is received within a predetermined time, processing terminates at step S95. If a request to download data to the connected printer is received at step S93, processing continues at step S96 where image data prepared for printing (as described with reference to FIG. 25) is obtained. At step S97 the obtained image data is used to generate a list of commands which are to be provided to the printer to cause printing to take place. The processing of step S97 may determine that the image to be printed includes items which cannot be printed using the printer which is to be used. Such items are removed from the data at step S98. Thus, having completed the processing described above commands suitable to be provided to the printer have been generated, and these commands are supplied to the printer at step S99. Having supplied commands to the printer at step S99, processing returns to step S92, and continues as described above.

FIG. 28 shows various features of the connection and communication process in further detail. At step S100, configuration data needed to establish a connection is obtained. This data will include the bluetooth address of the printer which is to be controlled. At step S101 a bluetooth connection between the PDA 10 and the printer to be controlled is configured, and the connection is established at step S102. At step S103 the PDA is ready to transmit data, and awaits receipt of suitable data to send. In parallel with the processing of step S103 (that is within a different thread), a loop is established at step S104 awaiting receipt of data. If data is received, processing passes to step S105. After receiving and processing data, processing returns from step S105 to step S104. It should be noted that data received at step S104 can include response data which is processed at step S109, as well as status information which is processed at step S93 (FIG. 27) as described below If data is not received, the loop of step S104 continues.

From step S103, processing passes to step S106 when data to be transmitted is received. This data is transmitted at step S107, and a response is awaited at step S108. If a response is received at step S105 (which runs in a different thread), this is validated at step S109, and if this validation is successful, processing passes to step S110 where details of the response are passed to the user.

If no response is received at step S108 within a predetermined time period, processing passes to step S111 where a check is made to determine whether it is appropriate to retry the sending of data, on the basis of a number of previous retries. If a retry is determined to be appropriate, processing returns to step S107. Otherwise, the connection is terminated at step S112. It should be noted that if the validation of step S109 is not successful, processing passes to step S111, where a retry is potentially attempted.

The embodiment of the invention described above has referred to barcodes, and barcode scanners, it will be understood that the invention is in no way restricted to such systems. Indeed any suitable identifier which can be read by a scanner can be used. For example in some embodiments of the invention, radio frequency identifiers (RFID) and appropriate scanners are used. Indeed, in some embodiments of the invention machine readable identifiers are not used to identify printers. Instead a user inputs an identifier for a printer which is to be controlled. Such an identifier may be printed on to a label as plain text, the label then being affixed to the printer.

In some embodiments of the invention, connection to a particular printer involves the PDA 10 determining all printers within communicable range, and displaying names for such printers (determined from a datastore using techniques such as those described above). A user can then select a desired printer from the displayed names.

It has been described above that the PDA 10 stores a database shown in FIG. 17 which is used to generate images for printing. Referring to FIG. 30, a database 93 having a form as illustrated in FIG. 17 is preferably accessible via a host computer 94, and downloaded to the PDA 10 from the host computer 93. A local database 95 is then stored on the PDA 10.

The database 93 is preferably created using the host computer 94, in accordance with processing schematically shown in FIG. 31. A master database 96 stores a plurality of rules which allow images to be printed to be generated. Such rules will include rules which can be used to calculate use by dates. For example, it may be specified that a use by date is computed to be the date of packaging, plus ten days. However, if a computed date falls on a Sunday, the rule may specify that the use by date should in fact be the preceding day. Many other such rules can be specified. The master database 96 storing the rules is populated by a user of the host computer 94, using an appropriate user interface.

The process shown in FIG. 31 also uses a production plan 97, which specifies printing operations to be carried out on particular dates. Rules of the master database 96 are then applied to the production plan 95 by a process 98, to generate a the database of coding jobs 93 which has a form as described with reference to FIG. 17.

When the database of coding jobs 93 has been created as described above, a subset of records is downloaded to create the local database 95 stored on the PDA 10. Records downloaded in this way are then used in printing operations of the type described above.

Records to be downloaded to the PDA 10 can either be selected automatically on the basis of fields of the records (e.g. date fields indicating when printing is to take place) or be selected individually or in groups by a user. In preferred embodiments of the invention, records to be downloaded are automatically selected. Given that each record of the coding jobs database 93 has an associated printing date (determined at its time of creation from the production plan 97), records to be downloaded can be selected to be those relating to print jobs taking place on a particular date. Alternatively, records relating to print jobs which are to take place within a predetermined time period starting from the current date could be downloaded. In this way, an automatically selected subset of data is downloaded from the host machine 95 to the PDA 10 to create the local datastore 95. Having downloaded appropriate records, printing operations as described above can then be carried out.

Figure 32:
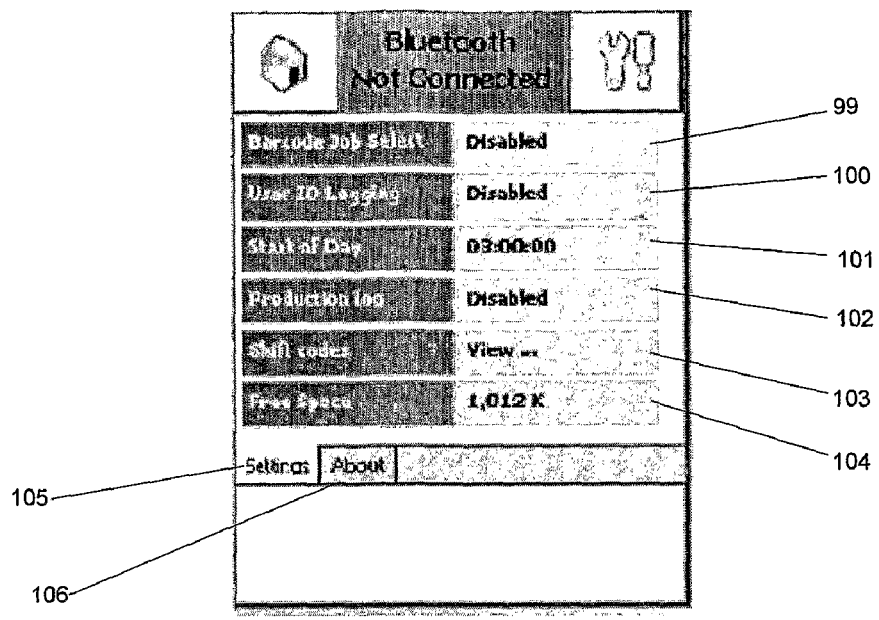
FIGS. 32 and 33 are screenshots of configuration screens provided by software operating on the PDA.

It has been described above that many screens displayed to the user include the settings button 47. Selection of this settings button results in the display of a screen as shown in FIG. 32. This screen shows current settings of the PDA 10, which are stored in a configuration data store stored on the PDA 10, which may be synchronised with the corresponding data store on the host machine 94. In general, it is preferred that the configuration data can only be amended by an authorised user of the host machine 94, and then downloaded onto the PDA 10. That is, it is preferred that it is not possible to amend configuration data using the PDA 10.

Referring to FIG. 32 it can be seen that an area 99 indicates whether selection of jobs using barcodes is selected. An area 100 indicates whether user logging is enabled. That is, whether operations carried out by the PDA 10 will be recorded within a log. An area 101 indicates a time of day at which a day is considered to begin within a printing plant in which the PDA 10 is used. An area 102 indicates whether a production log is being generated, an area 103 stores shift code details, while an area 104 indicates a quantity of free space available on the PDA 10.

Figure 33:
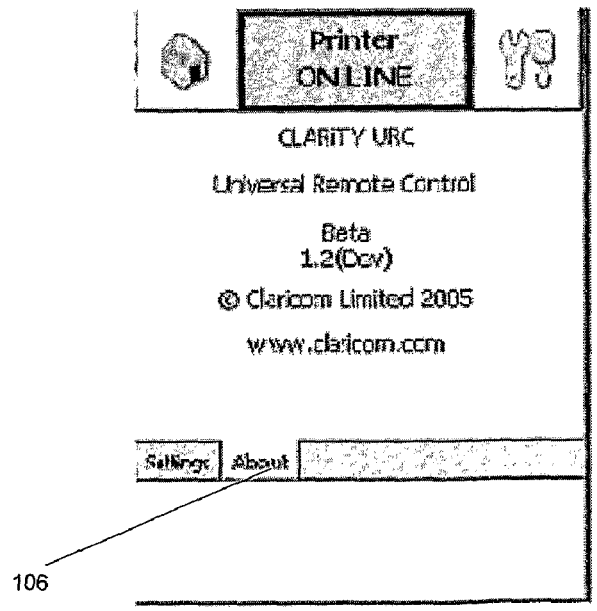

It can be seen from FIG. 32 that the components described above are part of a settings tab 105. It can further be seen that the illustrated screen comprises an about tab 106. Selection of the about tab 101 causes display of a screen shown in FIG. 33, which indicates properties of the PDA 10.

In the preceding description, embodiments of the invention have been described with reference to a PDA, it will be appreciated that the invention need not be implement using a PDA, but can instead be implemented using any suitable computer device such as a laptop or tablet computer. Similarly, where the preceding description has made reference to bluetooth communication, it will be appreciated that other wireless communications protocols such as infra-red communication can also be used to implement the invention.

In some of the embodiments described above, data defining a printing operation is downloaded from the PDA 10 to a printer on which the printing operation is to be carried out. That is, data is assembled on the PDA 10, and that data is provided to the printer via a connection established in the manner described above. In some embodiments of the present invention, although the PDA 10 is able to control the printer the PDA 10 does not itself provide data directly to the printer. Rather, the PDA 10 simply provides commands to the printer and these commands are used so as to obtain data from a remote data source. Obtaining data from such remote data source can be managed by the printer itself in response to a command received from the PDA 10. That is, in some embodiments of the invention, data to be used in a printing operation is not provided by the PDA 10 but is instead provided from a data source remote from the PDA 10.

In some embodiments of the invention, printers which are to be controlled provide a plurality of webpages which can be browsed using a device such as the PDA 10. In this way, the PDA 10 provides a convenient device on which the user interface of a printer can be accessed by accessing the webpages. By using the PDA 10, a user is able to make various selections from the webpages provided by the printer and the printer then acts upon those selections.

The PDA 10 can in some cases instruct the printer to carry out a printing operation by establishing a connection with the printer so as to access appropriate webpages, simply commanding the printer to carry out a printing operation based upon data stored within its memory. In some cases, printers will store a plurality of different print jobs within memory and in these cases the commands provided by the PDA can select data for a particular one of those print jobs.

From the preceding description it will be appreciated that the invention therefore provides a convenient mechanism by which a PDA can be used to control a printer in a plurality of different ways. In some cases data defining a print job is provided to the printer from the PDA, but in other cases only commands are provided to the printer to cause particular print jobs to be carried out.

Although preferred embodiments of the invention have been described above, it will be appreciated that various modifications can be made. Such modifications are considered to lie within the spirit and scope of the present invention.

The invention claimed is:

1. A method for controlling a printer of a plurality of printers to carry out a printing operation, the method comprising, at a controller device: reading an identifier associated with said printer;
   generating first input data in response to said read identifier, said first input data comprising data for identifying said printer;
   establishing a connection between said controller device and said printer in response to said first input data; and
   using said established connection to control said printer.

2. A method according to claim 1, wherein controlling said printer comprises causing data for use in said printing operation to be provided to said printer.

3. A method according to claim 2, wherein said data is provided to said printer from said controller device.

4. A method according to claim 2, wherein causing data for use in said printing operation to be provided to said printer comprises: assembling data for use in said printing operation; and
   providing said assembled data to said printer via said established connection.

5. A method according to claim 4, wherein assembling data for use in said printing operation comprises:
   generating at least one command commanding said printer to carry out said printing operation.

6. A method according to claim 5, wherein generating said at least one command comprises:
   generating at least one command specifying image data to be printed.

7. A method according to claim 4, further comprising: disconnecting said connection after said assembled data has been provided to said printer via said connection.

8. A method according to claim 2, wherein said data is provided directly to said printer from a data store remote from said controller device.

9. A method according to claim 1, wherein controlling said printer comprises issuing a command to said printer to transfer data from a first data storage location to a second data storage location.

10. A method according to claim 9, wherein said first and second data storage locations are provided by said printer.

11. A method according to claim 1, wherein said read identifier comprises machine readable information.

12. A method according to claim 11, wherein said machine readable information is a barcode, magnetically readable information, a radio frequency identifier or machine readable text.

13. A method according to claim 1, further comprising: obtaining an address associated with said printer based upon said first input data; and
   using said address to establish said connection between said controller device and said printer.

14. A method according to claim 1, wherein establishing said connection comprises establishing a connection between said controller device and a communications interface, said communications interface being connected to said printer.

15. A method according to claim 1, wherein establishing said connection comprises establishing a wireless connection.

16. A method for controlling a printer of a plurality of printers to carry out a printing operation, the method comprising, at a controller device:
   reading a machine readable identifier associated with said printer;
   generating first input data in response to said read identifier, said first input data comprising data for identifying said printer;
   establishing a wireless connection between said controller device and said printer in response to said first input data; and
   using said established connection to control said printer; and
   wherein establishing said wireless connection comprises:
      generating data identifying any of the plurality of printers that are wirelessly detectable by said controller device;
      determining whether one of said identified printers is said printer identified by said first input data; and
      if said determining indicates that one of said identified printers is said printer identified by said first input data, establishing a connection with said printer.

17. A method according to claim 16, further comprising: obtaining an address for said printer identified by said first input data; and obtaining an address for the or each printer detectable by said controller device; wherein said determining is based upon said obtained addresses.

18. A method according to claim 15, wherein said wireless connection is one of a bluetooth connection, an infrared connection, a wireless telephony connection or a local area network connection.

19. A method according to claim 4, wherein assembling data comprises:
   assembling data from a data store stored on said controller device.

20. A method according to claim 1, further comprising: receiving second input data comprising data identifying said printing operation.

21. A method for controlling a printer of a plurality of printers to carry out a printing operation, the method comprising, at a controller device:
   reading a first identifier associated with said printer;
   generating first input data in response to said read first identifier, said first input data comprising data for identifying said printer;
   establishing a connection between said controller device and said printer in response to said first input data;
   using said established connection to control said printer;
   reading a second identifier associated with said printing operation; and
   generating second input data in response to said read second identifier, said second input data comprising data for identifying said printing operation.

22. A method according to claim 21, wherein said read identifier is machine readable information.

23. A method according to claim 22, wherein said machine readable information is a barcode, magnetically readable information, machine readable text or a radio frequency identifier.

24. A method according to claim 21, wherein receiving said second input data comprises:
  displaying a menu to a user;
  receiving data indicating user selection of an item from said menu; and generating said second input data based upon said menu selection.

25. A method according to claim 21 comprising:
  assembling data for use in said printing operation; and
  providing said assembled data to said printer via said established connection; and wherein assembling data comprises:
  retrieving data from a data store in response to said second input data, said retrieved data indicating data required for use in said printing operation, and further indicating a form in which said data for use in said printer operation is to be assembled.

26. A method according to claim 25, wherein said data store is stored in a memory of said controller device.

27. A method according to claim 26, further comprising:
  establishing a connection between said controller device and a host machine; and downloading data from said host machine to said controller device to form said data store.

28. A method according to claim 27, wherein said host machine provides access to a master data store comprising a plurality of records; and
  said downloading downloads a subset of said plurality of records to said controller device.

29. A method according to claim 28, wherein said subset of said plurality of records are selected by a user.

30. A method according to claim 29, wherein said subset or records is selected based upon data stored within said subset of records.

31. A method according to claim 30, wherein each of said plurality of records has associated time data, and said subset of said plurality of records are selected using said time data.

32. A method according to claim 25, further comprising:
  processing said retrieved data to identify data required for use in said printing operation; and
  obtaining at least some of said identified data from a further data store.

33. A method according to claim 32, wherein said further data store is stored on said controller device.

34. A method according to claim 25, further comprising:
  processing said retrieved data to identify data required for use in said printing operation; and
  prompting a user to enter data corresponding to at least some of said identified data.

35. A method according to claim 34, wherein prompting a user to enter data comprises:
  displaying a plurality of data values to the user; and
  receiving data indicating user selection of one of said values.

36. A method according to claim 35, wherein prompting a user to enter data comprises:
  computing said plurality of data values.

37. A method according to claim 36, wherein computing said plurality of data values comprises:
  applying at least one rule to predetermined data to generate a plurality of date values.

38. A method according to claim 1, further comprising: displaying to a user an image corresponding to data to be printed in said printing operation using said assembled data.

39. A method according to claim 1, wherein said assembled data is generated from data in a printer independent format.

40. A method according to claim 39, wherein said assembling data comprises converting said data in said printer independent format into a format suitable for said printer.

41. A method according to claim 40, wherein said converting comprises:
  processing said first input data to determine a printer command protocol; and converting said data in said printer independent format, into corresponding data in said printer command protocol.

42. A computer readable memory medium carrying non-transitory computer readable program code configured to control a computer to carry out a method according to claim 1.

43. A device for controlling a printer of a plurality of printers to carry out a printing operation, the device comprising:
  a reader configured to read an identifier associated with said printer;
  means for generating first input data in response to said read identifier, the first input data comprising data for identifying said printer;
  communication means for establishing a connection between the device and said printer in response to said first input data; and
  a processor configured to control said printer using said established connection.

44. A device according to claim 43, wherein said processor is configured to generate at least one command commanding said printer to carry out said printing operation.

45. A device according to claim 44, wherein said processor is configured to generate at least one command specifying image data to be printed.

46. A device according to claim 43, wherein said processor is configured to cause data for use in said printer operation to be provided to said printer.

47. A device according to claim 46, wherein said data is provided to said printer from said device.

48. A device according to claim 46, wherein said processor is configured to:
  assemble data for use in said printing operation;
  provide said assembled data to said printer via said established connector.

49. A device according to claim 46, wherein said processor is configured to cause data for use in said printing operation to be provided from a data store remote from said device.

50. A device according to claim 43, wherein said processor is configured to control said printer by causing said printer to transfer data from a first data storage location to a second data storage location.

51. A device according to claim 43, wherein said reader is a barcode scanner, a magnetically readable information reader, a radio frequency identifier reader or a machine readable text reader.

52. A device according to claim 43, wherein said communication means comprises a wireless communications interface, and said connection is a wireless connection.

53. A device according to claim 52, wherein said wireless communications interface is one of a bluetooth communications interface, an infrared communications interface, a wireless telephony interface or a local area network interface.

54. A device according to claim 43, further comprising:
  means for receiving second input data comprising data for identifying said printing operation.

55. A device according to claim 54, wherein said processor is configured to generate said second input data from an identifier read by said reader.

56. A device according to claim 43, wherein said device comprises:
   a storage device storing data; and
   said processor is configured to assemble data from said stored data.

57. A device according to claim 56, further comprising:
   means for establishing a connection between said controller device and a host machine; and
   means for downloading data from said host machine to said controller device to form said data store.

58. A device according to claim 43, in communication with a communications interface said communications interface being connected to said printer.

59. A device according to claim 43, wherein said device is a handheld device.

60. A device according to claim 59, wherein said handheld device is a personal digital assistant (PDA).

61. A device for controlling a printer of a plurality of printers to carry out a printing operation, the device comprising:
   a reader operable to read an identifier associated with said printer; a communications interface; and
   a processor;
   wherein the processor is operable to generate first input data comprising data for identifying the printer in response to said read identifier, the communications interface is operable to establish a connection between the device and the printer in response to said first input data, and the processor is operable to control said printer using said established connection.

* * * * *